United States Patent
Li et al.

(10) Patent No.: US 12,170,915 B2
(45) Date of Patent: Dec. 17, 2024

(54) SIDELINK RADIO LINK FAILURE DETECTION

(71) Applicant: QUALCOMM Incorporated, San Diego, CA (US)

(72) Inventors: Qing Li, Princeton Junction, NJ (US); Junyi Li, Fairless Hills, PA (US); Ozcan Ozturk, San Diego, CA (US); Shuanshuan Wu, San Diego, CA (US); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 314 days.

(21) Appl. No.: 17/651,775

(22) Filed: Feb. 18, 2022

(65) Prior Publication Data
US 2023/0269610 A1 Aug. 24, 2023

(51) Int. Cl.
*H04W 24/08* (2009.01)
*H04L 1/1812* (2023.01)
(Continued)

(52) U.S. Cl.
CPC .......... *H04W 24/08* (2013.01); *H04L 1/1812* (2013.01); *H04L 1/203* (2013.01); *H04W 74/0816* (2013.01); *H04W 76/28* (2018.02)

(58) Field of Classification Search
CPC . H04W 74/0816; H04W 76/28; H04W 24/08; H04L 1/203; H04L 1/1812
(Continued)

(56) References Cited

U.S. PATENT DOCUMENTS

| 11,722,996 B2* | 8/2023 | Lee | H04W 72/21 |
| | | | 370/329 |
| 11,728,957 B2* | 8/2023 | Loehr | H04W 80/02 |
| | | | 370/329 |

(Continued)

FOREIGN PATENT DOCUMENTS

| EP | 3432675 A1 | 1/2019 |
| EP | 3817505 A1 | 5/2021 |

(Continued)

OTHER PUBLICATIONS

3GPP TS 38.331: "3rd Generation Partnership Project; Technical Specification Group Radio Access Network; NR; Radio Resource Control (RRC) Protocol Specification (Release 16)", 3GPP TS 38.331, V16.7.0, Dec. 23, 2021, pp. 1-963, XP052083424, pp. 227, 348, 785, 865, Paragraph [05.6].

(Continued)

*Primary Examiner* — Peter G Solinsky
(74) *Attorney, Agent, or Firm* — Harrity & Harrity, LLP

(57) ABSTRACT

Various aspects of the present disclosure generally relate to wireless communication. In some aspects, a user equipment (UE) may obtain a first indication, based at least in part on a first threshold, that a hybrid automatic repeat request (HARQ) discontinuous transmission (DTX) is caused by a listen-before-talk (LBT) failure. The UE may obtain a second indication, based at least in part on a second threshold, that the HARQ DTX caused by the LBT failure is a type of HARQ DTX that is to be counted for identifying a sidelink radio link failure (RLF). The UE may identify the sidelink RLF based at least in part on detecting a number of consecutive occurrences of the type of HARQ DTX occurrences. Numerous other aspects are described.

30 Claims, 11 Drawing Sheets

(51) Int. Cl.
*H04L 1/20* (2006.01)
*H04W 74/0816* (2024.01)
*H04W 76/28* (2018.01)

(58) Field of Classification Search
USPC .......................................................... 370/329
See application file for complete search history.

(56) References Cited

U.S. PATENT DOCUMENTS

| | | | | |
|---|---|---|---|---|
| 11,825,297 | B2* | 11/2023 | Li | H04W 72/569 |
| 2017/0332358 | A1* | 11/2017 | Park | H04L 1/1671 |
| 2018/0054237 | A1 | 2/2018 | Tseng et al. | |
| 2019/0036831 | A1* | 1/2019 | Li | H04W 72/23 |
| 2023/0217268 | A1* | 7/2023 | Ganesan | H04W 72/046 |
| | | | | 370/329 |
| 2023/0217493 | A1* | 7/2023 | Yi | H04W 74/0866 |
| | | | | 370/329 |
| 2023/0232446 | A1* | 7/2023 | Jiang | H04W 74/02 |
| | | | | 370/329 |
| 2023/0254025 | A1* | 8/2023 | Kumar | H04W 24/10 |
| | | | | 370/252 |
| 2023/0328807 | A1* | 10/2023 | Wu | H04L 1/08 |
| | | | | 370/329 |

FOREIGN PATENT DOCUMENTS

| | | |
|---|---|---|
| EP | 3883281 A1 | 9/2021 |
| EP | 4149141 A1 | 3/2023 |
| WO | WO-2021089548 A1 | 5/2021 |
| WO | WO-2021228196 A1 | 11/2021 |
| WO | WO-2021232340 A1 | 11/2021 |
| WO | WO-2023036933 A1 | 3/2023 |

OTHER PUBLICATIONS

Partial International Search Report—PCT/US2023/060742—ISA/EPO—May 30, 2023.
Qualcomm Incorporated: "Discussion on Sidelink LBT Impact", 3GPP TSG RAN WG2 Meeting #118-e, R2-2210281, 3rd Generation Partnership Project (3GPP), Mobile Competence Centre, 650, Route Des Lucioles, F-06921, Sophia-Antipolis Cedex, France, vol. RAN WG2, No. E-meeting, May 9, 2022-May 20, 2022, Sep. 30, 2022, pp. 1-5, XP052263603, The Whole Document.
Qualcomm Incorporated: "Discussion on Sidelink LBT Impact", 3GPP TSG RAN WG2 Meeting #120, R2-2212689, Type Discussion, 3rd Generation Partnership Project (3GPP), Mobile Competence Centre, 650, Route Des Lucioles, F-06921, Sophia-Antipolis Cedex, France, vol. 3GPP RAN 2, No. Toulouse, FR, Nov. 14, 2022-Nov. 18, 2022, Nov. 4, 2022, pp. 1-7, XP052216758, The Whole Document.
Interdigital Inc (Rapporteur): "Summary of [103#56] [NR-U] Connected Mode Mobility (InterDigital)", 3GPP TSG-RAN WG2 Meeting #103bis, R2-1814024 (R15 NRU SI AI 11222 103NR56), 3rd Generation Partnership Project (3GPP), Mobile Competence Centre, 650, Route Des Lucioles, F-06921 Sophia-Antipolis Cedex, France, vol. RAN WG2, No. Chengdu, China, Oct. 8, 2018-Oct. 12, 2018, Oct. 3, 2018, XP051523485, 12 pages, pp. 5-6,10, Section 2.2.
International Search Report and Written Opinion—PCT/US2023/060742—ISA/EPO—Aug. 8, 2023.

* cited by examiner

SIDELINK RADIO LINK FAILURE DETECTION

FIELD OF THE DISCLOSURE

Aspects of the present disclosure generally relate to wireless communication and to techniques and apparatuses for sidelink radio link failure detection.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include obtaining a first indication, based at least in part on a first threshold, that a hybrid automatic repeat request (HARQ) discontinuous transmission (DTX) is caused by a listen-before-talk (LBT) failure. The method may include obtaining a second indication, based at least in part on a second threshold, that the HARQ DTX caused by the LBT failure is a type of HARQ DTX that is to be counted for identifying a sidelink radio link failure (RLF). The method may include identifying the sidelink RLF based at least in part on detecting a number of consecutive the type of HARQ DTX occurrences.

Some aspects described herein relate to a method of wireless communication performed by a UE. The method may include obtaining an indication of an LBT success rate, an LBT failure rate, a signal-to-interference-plus-noise ratio (SINR), or a number of consecutive LBT failures associated with an LBT procedure. The method may include transmitting the indication of the LBT success rate, the LBT failure rate, the SINR, the CQI, the RSRQ, the RSRP, the CBR, the CR, the RSSI, or the number of consecutive LBT failures associated with the LBT procedure.

Some aspects described herein relate to an apparatus for wireless communication performed by a UE. The apparatus may include a memory and one or more processors, coupled to the memory. The one or more processors may be configured to obtain a first indication, based at least in part on a first threshold, that a HARQ DTX is caused by an LBT failure. The one or more processors may be configured to obtain a second indication, based at least in part on a second threshold, that the HARQ DTX caused by the LBT failure is a type of HARQ DTX that is to be counted for identifying a sidelink RLF. The one or more processors may be configured to identify the sidelink RLF based at least in part on detecting a number of consecutive the type of HARQ DTX occurrences.

Some aspects described herein relate to an apparatus for wireless communication performed by a UE. The apparatus may include a memory and one or more processors, coupled to the memory. The one or more processors may be configured to obtain an indication of an LBT success rate, an LBT failure rate, an SINR, or a number of consecutive LBT failures associated with an LBT procedure. The one or more processors may be configured to transmit the indication of the LBT success rate, the LBT failure rate, the SINR, the CQI, the RSRQ, the RSRP, the CBR, the CR, the RSSI, or the number of consecutive LBT failures associated with the LBT procedure.

Some aspects described herein relate to a non-transitory computer-readable medium that stores a set of instructions for wireless communication by a UE. The set of instructions, when executed by one or more processors of the UE, may cause the UE to obtain a first indication, based at least in part on a first threshold, that a HARQ DTX is caused by an LBT failure. The set of instructions, when executed by one or more processors of the UE, may cause the UE to obtain a second indication, based at least in part on a second threshold, that the HARQ DTX caused by the LBT failure is a type of HARQ DTX that is to be counted for identifying a sidelink RLF. The set of instructions, when executed by one or more processors of the UE, may cause the UE to identify the sidelink RLF based at least in part on detecting a number of consecutive the type of HARQ DTX occurrences.

Some aspects described herein relate to a non-transitory computer-readable medium that stores a set of instructions for wireless communication by a UE. The set of instructions, when executed by one or more processors of the UE, may cause the UE to obtain an indication of an LBT success rate, an LBT failure rate, an SINR, or a number of consecutive LBT failures associated with an LBT procedure. The set of instructions, when executed by one or more processors of the UE, may cause the UE to transmit the indication of the LBT success rate, the LBT failure rate, the SINR, the CQI, the RSRQ, the RSRP, the CBR, the CR, the RSSI, or the number of consecutive LBT failures associated with the LBT procedure.

Some aspects described herein relate to an apparatus for wireless communication. The apparatus may include means for obtaining a first indication, based at least in part on a first threshold, that a HARQ DTX is caused by an LBT failure. The apparatus may include means for obtaining a second indication, based at least in part on a second threshold, that the HARQ DTX caused by the LBT failure is a type of HARQ DTX that is to be counted for identifying a sidelink RLF. The apparatus may include means for identifying the sidelink RLF based at least in part on detecting a number of consecutive the type of HARQ DTX occurrences.

Some aspects described herein relate to an apparatus for wireless communication. The apparatus may include means for obtaining an indication of an LBT success rate, an LBT failure rate, a signal-to-interference-plus-noise ratio (SINR), or a number of consecutive LBT failures associated with an LBT procedure. The apparatus may include means for transmitting the indication of the LBT success rate, the LBT failure rate, the SINR, the CQI, the RSRQ, the RSRP, the CBR, the CR, the RSSI, or the number of consecutive LBT failures associated with the LBT procedure.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
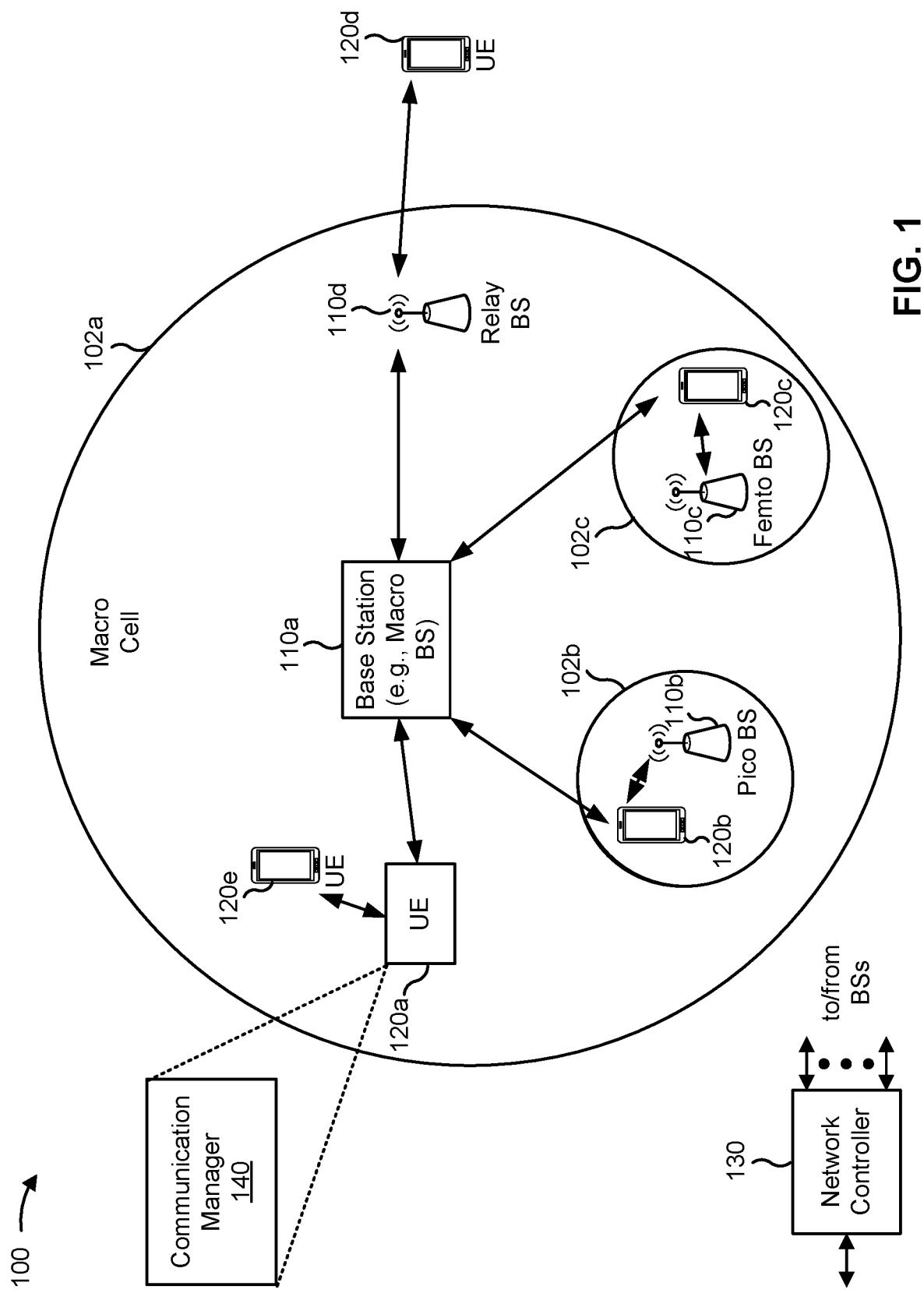
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another).

For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110. In some examples, the UE 120 may be under the base station 110's coverage (e.g., the UE 120a and the UE 120e are under base station 110a's coverage). In some examples, the UE 120 may be out of the base station 110's coverage (e.g., the UE 120d is out of the base station 110a's coverage).

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 (e.g., the UE 120a and the UE 120e) may include a communication manager 140. As described in more detail elsewhere herein, the communication manager 140 may obtain a first indication, based at least in part on a first threshold, that a hybrid automatic repeat request (HARQ) discontinuous transmission (DTX) is caused by a listen-before-talk (LBT) failure; obtain a second indication, based at least in part on a second threshold, that the HARQ DTX caused by the LBT failure is a type of HARQ DTX that is to be counted for identifying a sidelink radio link failure (RLF); and identify the sidelink RLF based at least in part on detecting a number of consecutive the type of HARQ DTX occurrences. Additionally, or alternatively, the communication manager 140 may perform one or more other operations described herein.

In some aspects, the communication manager 140 may obtain an LBT success rate, an LBT failure rate, a signal-to-interference-plus-noise ratio (SINR), or a number of consecutive LBT failures associated with an LBT procedure; and transmit the indication of the LBT success rate, the LBT failure rate, the SINR, the CQI, the RSRQ, the RSRP, the CBR, the CR, the RSSI, or the number of consecutive LBT failures associated with the LBT procedure. Additionally, or alternatively, the communication manager 140 may perform one or more other operations described herein.

As indicated above, FIG. 1 is provided as an example. Other examples may differ from what is described with regard to FIG. 1.

Figure 2:
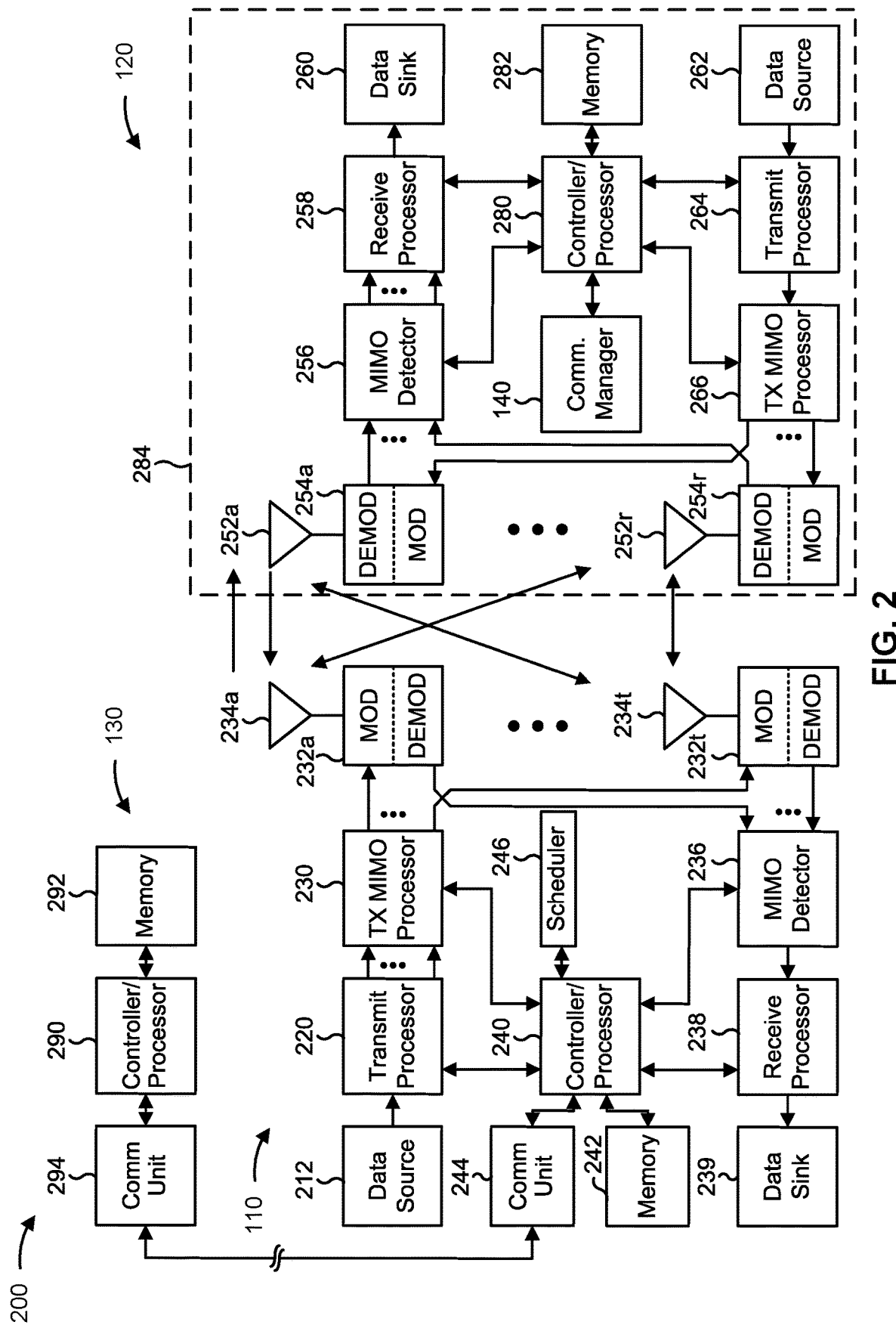
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, a signal-to-interference-plus-noise ratio (SINR), a CQI parameter, channel busy ratio (CBR), channel occupancy ratio (CR), and/or a successful or failed listen-before-talk (LBT), among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-11).

The controller/processor 240 of the base station 110, the controller/processor 280 of the UE 120, and/or any other component(s) of FIG. 2 may perform one or more techniques associated with sidelink RLF detection, as described in more detail elsewhere herein. For example, the controller/processor 240 of the base station 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, the UE 120 includes means for obtaining a first indication, based at least in part on a first threshold, that a HARQ DTX is caused by an LBT failure; means for obtaining a second indication, based at least in part on a second threshold, that the HARQ DTX caused by the LBT failure is a type of HARQ DTX that is to be counted for identifying a sidelink RLF; and/or means for identifying the sidelink RLF based at least in part on detecting a number of consecutive the type of HARQ DTX occurrences. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE 120 includes means for obtaining an indication of an LBT success rate, an LBT failure rate, an SINR, or a number of consecutive LBT failures associated with an LBT procedure; and/or means for transmitting the indication of the LBT success rate, the LBT failure rate, the SINR, the CQI, the RSRQ, the RSRP, the CBR, the CR, the RSSI, or the number of consecutive LBT failures associated with the LBT procedure. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
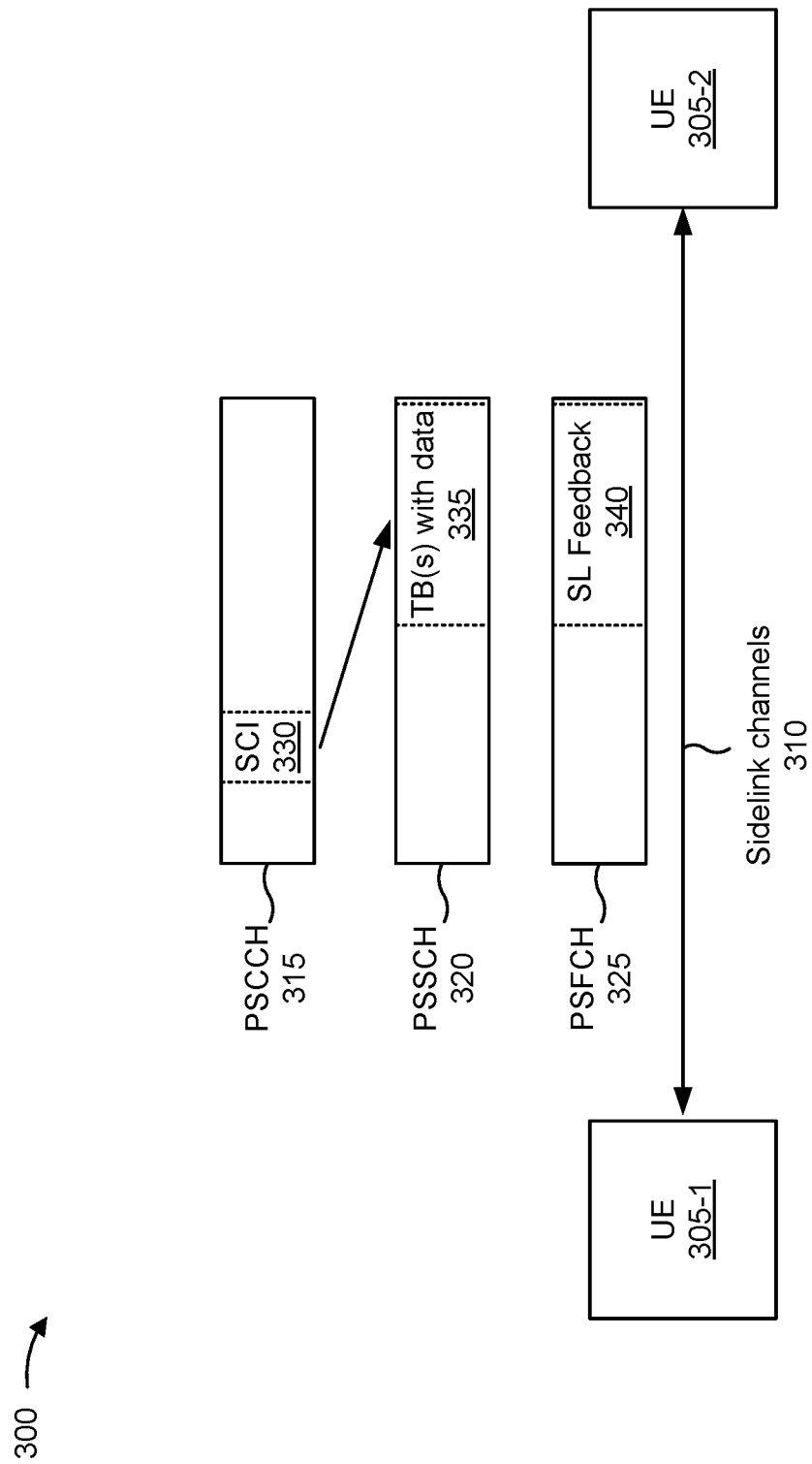
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band) in a licensed or unlicensed spectrum. Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as HARQ feedback (e.g., acknowledgement (ACK) or negative acknowledgement (NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be multiplexed and transmitted with the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH demodulation reference signal (DMRS) pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 320, such as a HARQ process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a sidelink resource allocation mode (e.g., Mode 1) where resource selection and/or scheduling is performed by a base station 110. For example, the UE 305 may receive a grant (e.g., in downlink control information (DCI) or in a radio resource control (RRC) message, such as for configured grants) from the base station 110 for sidelink channel access and/or scheduling. In some aspects, a UE 305 may operate using a sidelink resource allocation mode (e.g., Mode 2) where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure an RSRP parameter (e.g., a PSSCH-RSRP or PSCCH-RSRP parameter) associated with various sidelink channels, may measure a reference signal received quality (RSRQ) parameter (e.g., a PSSCH-RSRQ or PSCCH-RSRQ parameter) associated with various sidelink channels, may measure a signal-to-interference-plus-noise ratio (SINR) (e.g., a PSSCH-SINR or PSCCH-SINR parameter) associated with various sidelink channels, and/or may measure a CQI parameter (e.g., a PSSCH-CQI) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy ratio (CBR) and/or channel occupancy ratio (CR) associated with various sidelink channels, which may be used for rate control (e.g., by indicating a maximum number of resource blocks that the UE 305 can use for a particular set of subframes).

Additionally, or alternatively, the UE 305 may perform listen-before-talk (LBT) for detecting if a channel is occupied by another device, which may be used for the UE 305 to determine to access the channel on a shared spectrum (e.g., an unlicensed spectrum).

In the resource allocation mode where resource selection and/or scheduling is performed by a UE 305 (e.g., Mode 2), the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or a modulation and coding scheme (MCS) to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

In some cases, the UE 305-1 or the UE 305-2 may detect an RLF in one or more of the sidelink channels 310. The RLF may be detected based at least in part on a number of consecutive HARQ DTX occurrences. However, as described herein, frequent RLF detection may result in disrupted communications, and channel selection may require significant UE resources.

As indicated above, FIG. 3 is provided as an example. Other examples may differ from what is described with respect to FIG. 3.

Figure 4:
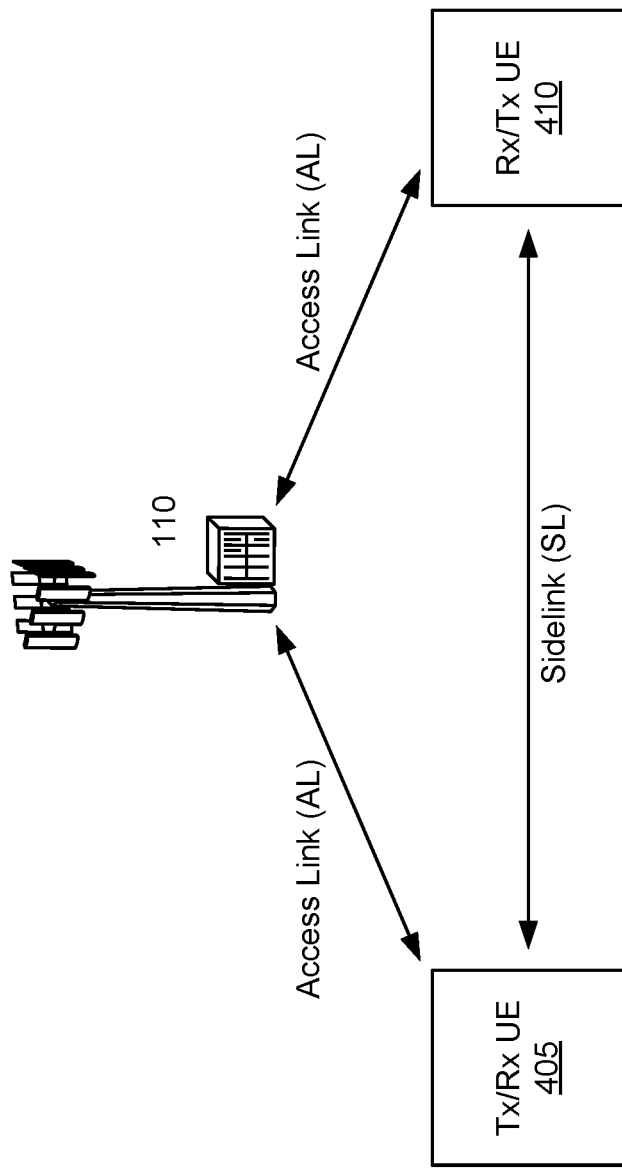
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

In some cases, the UE 405 or the UE 410 may detect an RLF in the sidelink channel. The RLF may be detected based at least in part on a number of consecutive HARQ DTX occurrences. However, as described herein, frequent RLF detection may result in disrupted communications, and channel selection may require significant UE resources.

As indicated above, FIG. 4 is provided as an example. Other examples may differ from what is described with respect to FIG. 4.

Figure 5:
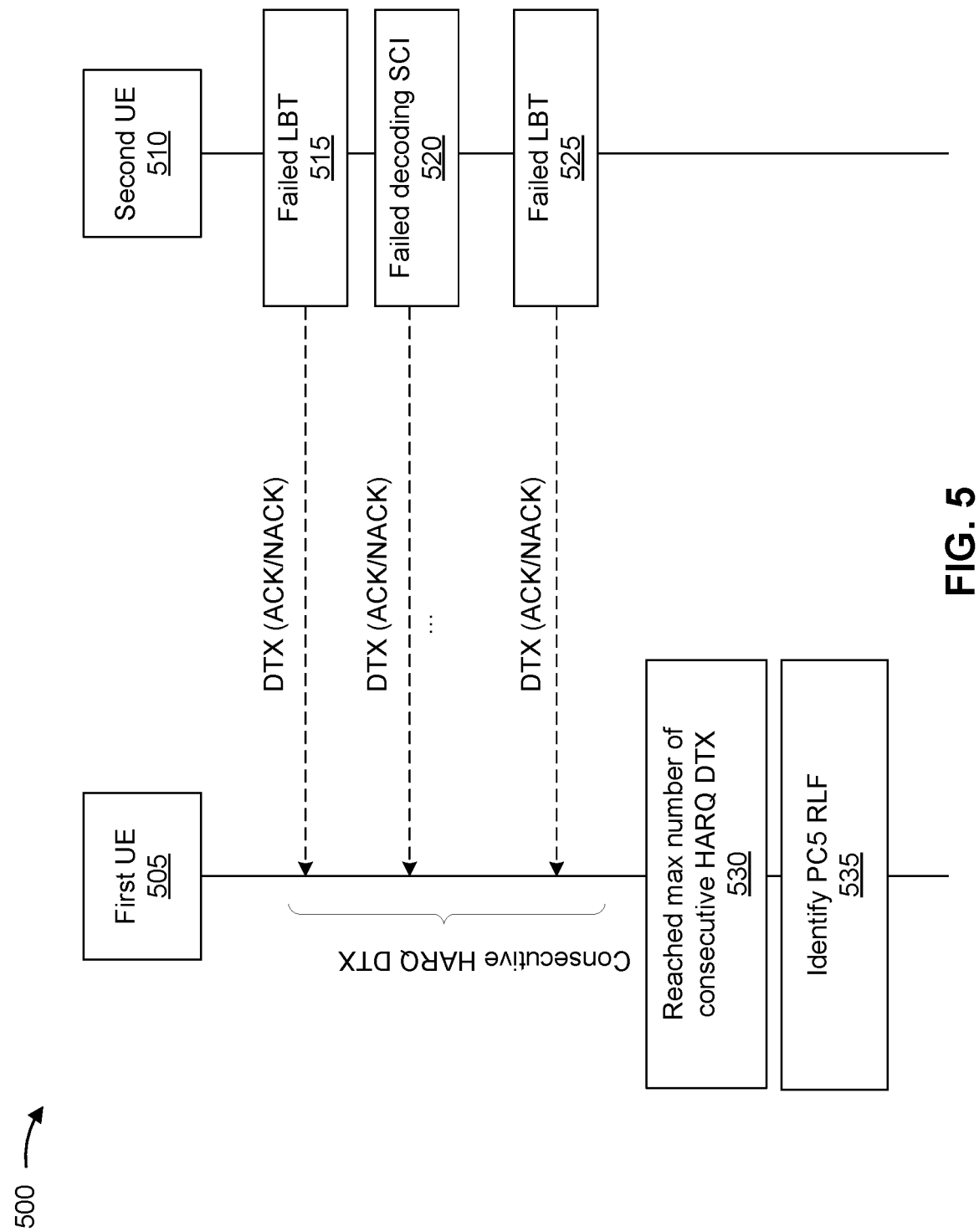
FIG. 5 is a diagram illustrating an example associated with hybrid automatic repeat request (HARQ) discontinuous transmission (DTX), in accordance with the present disclosure.

FIG. 5 is a diagram illustrating an example 500 of HARQ DTX, in accordance with the present disclosure. A first UE, such as the first UE 505, may communicate with a second UE, such as the second UE 510. The first UE 505 and the second UE 510 may include some or all of the features of the UE 120.

In some cases, the first UE 505 and the second UE 510 may communicate via sidelink. For example, the first UE 505 may transmit or receive sidelink unicast communications from the second UE 510, and the second UE 510 may transmit or receive sidelink unicast communications from the first UE 505. The sidelink communications may be transmitted or received over the PC5 interface.

In some cases, an RLF for Uu communications between the first UE 505 (or the second UE 510) and the base station 110 may be detected based at least in part on a synchronization signal block (SSB) or CSI reference signal (CSI-RS). For example, one or more characteristics of the SSB or CSI-RS, or a failure to receive the SSB or CSI-RS, may indicate that the channel quality is poor, and that an RLF should be declared. However, sidelink RLF may be more difficult to properly detect since a sidelink SSB or sidelink CSI-RS may not be always available for radio link measurements. For example, transmitting and receiving a CSI-RS via sidelink among many UEs in proximity may result in significant signaling overhead.

In some cases, a sidelink RLF may be detected by the first UE 505 (or the second UE 510) based at least in part on an indication from a sidelink radio link control (RLC) entity that a maximum number of retransmissions for a specific destination has been reached. In some cases, the sidelink RLF may be detected based at least in part on an expiration of a timer, such as a T400 timer for RRCReconfiguration-Sidelink. In some cases, the sidelink RLF may be detected based at least in part on an indication from a MAC entity that a maximum number of consecutive HARQ DTX occurrences for a specific destination has been reached. In some cases, the sidelink RLF may be detected based at least in part on an integrity check failure indication from a sidelink packet data convergence protocol (PDCP) entity concerning a sidelink signaling radio bearer (SL-SRB), such as SL-SRB2 or SL-SRB3, for a specific destination.

In some cases, the first UE 505 (or the second UE 510) may be configured to perform one or more of a plurality of actions based at least in part on detecting the sidelink RLF. For example, the first UE 505 may be configured to release the data radio bearers (DRBs) of the destination, release the SRBs of the destination, discard the NR sidelink communication related configuration of the destination, reset the sidelink specific MAC of the destination, consider the PC5-RRC connection to be released for the destination, or indicate the release of the PC5-RRC connection to the upper layers for the destination, among other examples.

In some cases, in a shared or unlicensed frequency band, the first UE 505 (or the second UE 510) may contend against other devices for channel access before transmitting on a shared or unlicensed channel to reduce and/or prevent collisions on the shared or unlicensed channel. To contend for channel access, the first UE 505 may perform a channel access procedure, such as an LBT procedure or another type of channel access procedure, for shared or unlicensed frequency band channel access. The channel access procedure may be performed to determine whether the physical channel (e.g., the radio resources of the channel) are free to use or are busy (e.g., in use by another wireless communication device such as a UE, an IoT device, or a WLAN device, among other examples). The channel access procedure may include sensing or measuring the physical channel (e.g., performing an RSRP measurement, detecting an energy level, or performing another type of measurement) during a channel access gap (which may also be referred to as a contention window (CW)) and determining whether the shared or unlicensed channel is free or busy based at least in part on the signals sensed or measured on the physical channel (e.g., based at least in part on whether the measurement satisfies a threshold). If the first UE 505 determines that the channel access procedure was successful, the first UE 505 may perform one or more transmissions on the shared or unlicensed channel during a transmission opportunity (TXOP), which may extend for a channel occupancy time (COT).

In some cases, the first UE 505 may perform unlicensed communications with the base station 110 via the Uu interface. For example, the first UE 505 may use CAT4 or CAT2 LBT based channel accessing for downlink and uplink communications with the base station 110. In some cases, the base station 110 may schedule resources for the PDSCH for up to four consecutive slots using DCI. In some cases, the base station 110 may trigger retransmission of the HARQ-ACK feedback. In some cases, the base station 110 may schedule multiple slots for the PUSCH using a single uplink grant. In some cases, in NR unlicensed (NR-U) uplink, the first UE 505 may select a HARQ identifier (HARQ ID), redundancy version (RV), and/or a new data indicator (NDI), and may report the HARQ ID, RV, or NDI as part of the uplink control information (UCI) in each configured uplink PUSCH. However, unlicensed communications are not currently supported for the sidelink PC5 interface.

As shown in the example 500, a sidelink RLF may be detected based at least in part on one or more consecutive HARQ DTX occurrences. For example, the second UE 510 may fail to send an ACK or NACK in accordance with the HARQ process. The first UE 505 may detect or identify the RLF based at least in part on a certain number of consecutive HARQ DTX occurrences. For example, the first UE 505 may determine that a number of consecutive HARQ DTX occurrences (e.g., consecutively missing ACK or NACK feedback messages) is greater than a maximum number of consecutive HARQ DTX occurrences, and may identify the RLF based at least in part on the determination.

As shown in connection with reference number 515, a first HARQ DTX occurrence may result from a first failed LBT procedure by the second UE 510.

As shown in connection with reference number 520, a second HARQ DTX occurrence may result from the second UE 510 failing to successfully decode the SCI.

As shown in connection with reference number 525, a third HARQ DTX occurrence may result from a second failed LBT procedure by the second UE 510.

In some cases, the first HARQ DTX occurrence, the second HARQ DTX occurrence, and the third HARQ DTX occurrence may be consecutive HARQ DTX occurrences.

As shown in connection with reference number 530, the first UE 505 may determine that a maximum number of consecutive HARQ DTX occurrences has been reached. For example, the maximum number of consecutive HARQ DTX occurrences may be three consecutive HARQ DTX occurrences.

As shown in connection with reference number 535, the first UE 505 may identify the sidelink RLF based at least in part on the number of consecutive HARQ DTX occurrences being greater than, or greater than or equal to, the maximum number of HARQ DTX occurrences.

In some cases, the first UE 505 may identify the sidelink RLF based at least in part on the number of consecutive HARQ DTX occurrences being greater than the maximum number of HARQ DTX occurrences, even though the channel may not necessarily have poor channel quality. In some cases, the failure of the second UE 510 to decode the SCI may indicate that the channel quality is poor, which is monitored or measured by the number of consecutive HARQ DTX occurrences (e.g., consecutively missing ACK or NACK feedback due to decoding failure of an SCI associated with a transmission). However, the failed LBT procedure may simply be a result of the channel being busy. For example, the channel quality may be acceptable but may be busy as the channel is being used by another device, such as a Wi-Fi enabled device. The first UE 505 may not be able to distinguish between HARQ DTX resulting from poor channel quality (e.g., the failed SCI decoding) and HARQ DTX resulting from a channel that is busy but otherwise may be acceptable (e.g., the failed LBT).

As described herein, frequent sidelink RLF detection is undesirable. For example, sidelink RLF detections may cause disruptions to communications that are using the channel. This is particularly true when the sidelink RLF is detected on a channel that does not necessarily have poor channel quality. Additionally, recovering the sidelink RLF may require a large number of UE resources. For example, in order to recover the channel, the first UE 505 may need to re-establish the PC5 RRC connection, re-set up radio bearers, and reconfigure sidelink communications, among other examples.

Techniques and apparatuses are described herein for sidelink RLF detection. In some aspects, the first UE 505 may obtain a first indication, based at least in part on a first threshold, that a HARQ DTX is caused by an LBT failure. The first UE 505 may obtain a second indication, based at least in part on a second threshold, that the HARQ DTX caused by the LBT failure is a type of HARQ DTX that is to be counted for identifying a sidelink RLF. The first UE 505 may identify the sidelink RLF based at least in part on the number of consecutive the type of HARQ DTX occurrences that should be counted for identifying the sidelink RLF failure being greater than a maximum number of consecutive the type of HARQ DTX occurrences.

As described above, frequent sidelink RLF detection is undesirable as it may result in communication disruptions and require significant resources for channel recovery. This is particularly true when the sidelink RLF is detected on a channel that does not necessarily have poor channel quality. Using the techniques and apparatuses described herein, the first UE 505 may be able to distinguish between HARQ DTX occurrences that are due to poor channel quality (e.g., failed SCI decoding) and HARQ DTX occurrences that are due to LBT failures. Thus, the number of sidelink RLF detection occurrences may be reduced.

As indicated above, FIG. 5 is provided as an example. Other examples may differ from what is described with respect to FIG. 5.

Figure 6:
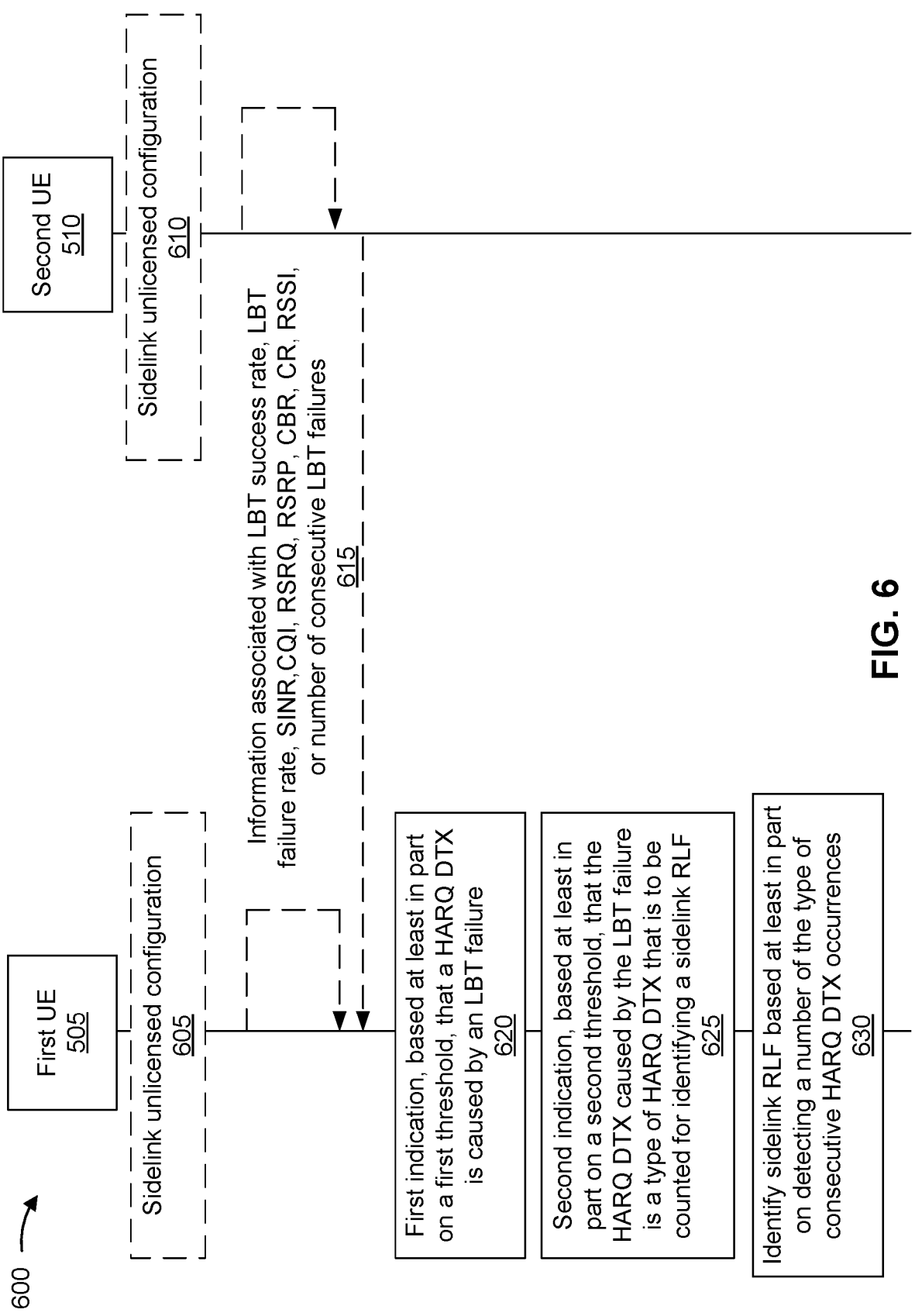
FIG. 6 is a diagram illustrating an example associated with sidelink radio link failure (RLF) detection, in accordance with the present disclosure.

FIG. 6 is a diagram illustrating an example 600 of sidelink RLF detection, in accordance with the present disclosure.

As shown in connection with reference number 605, the first UE 505 may obtain a sidelink unlicensed configuration. The sidelink unlicensed configuration may indicate one or more thresholds (described below) for counting consecutive HARQ DTX with LBT failures. In some aspects, the sidelink unlicensed configuration may be preconfigured by a manufacturer or service provider or by the base station 110 on the access link via Uu interface when the first UE 505 is under the coverage of the base station 110. In some aspects, the sidelink unlicensed configuration may be configured by a network node, such as a network node that includes the base station 110, or is included in the base station 110, when the first UE 505 is under the coverage of the base station 110. In some aspects, the sidelink unlicensed configuration may be configured by a special UE (e.g., the UE 120 as a group lead, a cluster head, an RSU, a scheduling UE, or a receiving or transmitting UE) on the sidelink via PC5 interface.

As shown in connection with reference number 610, the second UE 510 may obtain a sidelink unlicensed configuration. The sidelink unlicensed configuration may indicate one or more thresholds (described below) for counting consecutive HARQ DTX with LBT failures. The sidelink unlicensed configuration may be the same sidelink unlicensed configuration as the first UE 505, or may be a different sidelink unlicensed configuration. In some aspects, the sidelink unlicensed configuration may be preconfigured by a manufacturer or service provider or the base station 110. In some aspects, the sidelink unlicensed configuration may be configured by the base station 110 or a special UE (e.g., the UE 120).

As shown in connection with reference number 615, the first UE 505 or the second UE 510 may obtain information associated with an LBT success rate (e.g., the ratio of the number of successful LBTs and the number of total LBTs within a monitoring or measurement window (pre-)configured, an LBT failure rate (e.g., the ratio of the number of failed LBTs and the number of total LBTs, for example, within a monitoring or measurement window (pre-)configured, an SINR, CQI, or RSRQ (e.g., the SINR, CQI, or RSRQ associated with the PSCCH or PSSCH transmitted from the peer UE, for example, within a monitoring or measurement window (pre-)configured), an RSSI or RSRP (e.g., the RSSI or RSRP over the sidelink communication channel monitored, for example, within a monitoring or measurement window), a CBR and/or CR (e.g., the CBR and/or CR over the sidelink communication channel monitored, for example, within a monitoring or measurement window (pre-)configured), or a number of consecutive LBT failures.

In some aspects, the first UE 505 may obtain the information based at least in part on performing one or more measurements. For example, the first UE 505 may determine the LBT success rate based at least in part on a number of successful previous LBT procedures by the first UE 505 compared to a total number of previous LBT procedures. The LBT success rate may be the LBT success rate associated with the sidelink connection between the first UE 505 and the second UE 510. Similarly, the first UE 505 may determine the LBT failure rate based at least in part on a number of failed previous LBT procedures by the first UE 505 compared to the total number of previous LBT procedures. The LBT failure rate may be the LBT failure rate associated with the sidelink connection between the first UE 505 and the second UE 510. In some aspects, the first UE 505 may perform one or more measurements to determine the SINR, CQI, or RSRQ of the sidelink communication. The SINR may correspond to the ratio of the wanted signal power to the interference-plus-noise power for the sidelink communication from the second UE 510. The CQI may correspond to the channel quality indicator for the sidelink communication from the second UE 510. The RSRQ may correspond to the reference signal received quality for the sidelink communication from the second UE 510. In some aspects, the first UE 505 may perform one or more measurements to determine the RSSI or RSRP of the sidelink communication channel. The RSSI may correspond to the received signal strength indicator for the sidelink communication channel between the first UE 505 and the second UE 510. The RSRP may correspond to the reference signal received power (e.g., RSRP of PSSCH or PSCCH) for the sidelink communication channel between the first UE 505 and the second UE 510. In some aspects, the first UE 505 may perform one or more measurements to determine the CBR and/or CR of the sidelink communication channel. The CBR may correspond to the channel busy ratio for the sidelink communication channel between the first UE 505 and the second UE 510. The CR may correspond to the channel occupancy ratio for the sidelink communication channel between the first UE 505 and the second UE 510. In some aspects, the first UE 505 may measure (e.g., count) a number of consecutive LBT failures by the first UE 505. For example, the number of consecutive LBT failures may be the number of consecutive LBT failures within a time period.

In some aspects, the first UE 505 may obtain (e.g., receive) the information from the second UE 510. For example, the second UE 510 may transmit, and the first UE 505 may receive, a medium access control (MAC) message, such as a MAC control element (MAC CE), that includes some or all of the information. The information may be transmitted with other data, or may be transmitted by itself. In some aspects, the second UE 510 may determine the LBT success rate based at least in part on a number of successful previous LBT procedures performed by the second UE 510 compared to a total number of previous LBT procedures. The LBT success rate may be the LBT success rate associated with the sidelink connection between the first UE 505 and the second UE 510. Similarly, the second UE 510 may determine the LBT failure rate based at least in part on a number of failed previous LBT procedures performed by the second UE 510 compared to the total number of previous LBT procedures. The LBT failure rate may be the LBT failure rate associated with the sidelink connection between the first UE 505 and the second UE 510. In some aspects, the second UE 510 may perform one or more measurements to determine the SINR, CQI, or RSRQ of the sidelink communication. The SINR may correspond to the ratio of the wanted signal power to the interference-plus-noise power for the sidelink communication from the first UE 505. The CQI may correspond to the channel quality indicator for the sidelink communication from the first UE 505, The RSRQ may correspond to the reference signal received quality for the sidelink communication from the first UE 505. In some aspects, the second UE 510 may perform one or more measurements to determine the RSSI or RSRP of the sidelink communication channel. The RSSI may correspond to the received signal strength indicator for the sidelink communication channel between the first UE 505 and the second UE 510. The RSRP may correspond to the reference signal received power (e.g., RSRP of PSSCH or PSCCH) for the sidelink communication channel between the first UE 505 and the second UE 510. In some aspects, the second UE 510 may perform one or more measurements to determine the CBR and/or CR of the sidelink communication channel. The CBR may correspond to the channel busy ratio for the sidelink communication channel between the first UE 505 and the second UE 510. The CR may correspond to the channel occupancy ratio for the sidelink communication channel between the first UE 505 and the second UE 510. In some aspects, the second UE 510 may measure (e.g., count) a number of consecutive LBT failures by the second UE 510. For example, the number of consecutive LBT failures may be the number of consecutive LBT failures within a time period.

As shown in connection with reference number 620, the first UE 505 may obtain a first indication that a HARQ DTX is caused by an LBT failure. The first indication may be based at least in part on a first threshold. As described below, a parameter (e.g., LBT success rate, LBT failure rate, SINR, CQI, RSRQ, RSSI, RSRP, CBR and/or CR, or HARQ feedback occasion, among other examples) may be "above" a threshold if the parameter is greater than, or greater than or equal to, the threshold. Alternatively, the parameter may be "below" the threshold if the parameter is less than, or less than or equal to, the threshold.

In some aspects, the first indication that the HARQ DTX is caused by the LBT failure may be obtained based at least in part on the received information. For example, the first UE 505 may determine if the HARQ DTX is caused by the LBT failure based at least in part on the MAC CE received from the second UE 510 that includes the information associated with the LBT success rate, the LBT failure rate, the SINR, the CQI, the RSRQ, the RSSI, the RSRP, the CBR and/or CR, or the number of consecutive LBT failures. In this case, the first UE 505 may perform one or more of the following:

If the received LBT success rate is below a first LBT success rate threshold, the first UE 505 may determine that the HARQ DTX is caused by the LBT failure. Alternatively, if the received LBT success rate is above the first LBT success rate threshold, the first UE 505 may determine that the HARQ DTX is not caused by the LBT failure.

If the received LBT failure rate is above a first LBT failure rate threshold, the first UE 505 may determine that the HARQ DTX is caused by the LBT failure. Alternatively, if the received LBT failure rate is below the first LBT failure rate threshold, the first UE 505 may determine that the HARQ DTX is not caused by the LBT failure.

If the received SINR, CQI, or RSRQ of the sidelink communication is above a first SINR, CQI or RSRQ threshold (e.g., the sidelink connection satisfies a radio link quality condition), the first UE 505 may determine that the HARQ DTX is caused by the LBT failure. Alternatively, if the received SINR, CQI, or RSRQ of the sidelink communication is below the first SINR, CQI, or RSRQ threshold (e.g., the sidelink connection fails a radio link quality condition), the first UE 505 may determine that the HARQ DTX is caused by poor channel condition and not caused by the LBT failure.

If the received RSRP, CBR, or CR of the sidelink communication channel is above a first RSRP, CBR, or CR threshold (e.g., the sidelink channel is congested or interfered by other UEs, in other words, the sidelink connection may not satisfy a radio link quality condition), the first UE 505 may determine that the HARQ DTX is caused by poor channel condition and not by the LBT failure. Alternatively, if the received RSRP, CBR, or CR of the sidelink communication channel is below the first RSRP, CBR, or CR threshold (e.g., the sidelink connection satisfies a radio link quality condition), the first UE 505 may determine that the HARQ DTX is caused by the LBT failure.

If the received RSSI of the sidelink communication channel is above a first RSSI threshold (e.g., the sidelink connection is interfered by other UEs or Wi-Fi devices), the first UE 505 may determine that the HARQ DTX is caused by the LBT failure if the received RSRP, CBR or CR is below a first RSRP, CBR or CR threshold (e.g., more Wi-Fi devices); otherwise, the first UE 505 may determine that the HARQ DTX is not caused by the LBT failure if the received RSRP, CBR or CR is above a first RSRP, CBR or CR threshold (e.g., more UEs).

If the received the number of consecutive LBT failures is above a first consecutive LBT failures threshold (e.g., the sidelink channel is congested by Wi-Fi devices), the first UE 505 may determine that the HARQ DTX is caused by the LBT failure. Alternatively, if the received the number of consecutive LBT failures is below a first consecutive LBT failures threshold (e.g., the sidelink channel is not congested by Wi-Fi devices), the first UE 505 may determine that the HARQ DTX is not caused by the LBT failure.

In some aspects, the first UE 505 may determine that the HARQ DTX is caused by the LBT failure or not based on any combination of the received indications described above.

In some aspects, obtaining the first indication that the HARQ DTX is caused by the LBT failure may include performing one or more measurements to determine whether the HARQ DTX is caused by the LBT failure. In this case, the first UE 505 may perform one or more of the following:

If the measured LBT success rate is below a second LBT success rate threshold, the first UE 505 may determine that the HARQ DTX is caused by the LBT failure. Alternatively, if the measured LBT success rate is above the second LBT success rate threshold, the first UE 505 may determine that the HARQ DTX is not caused by the LBT failure.

If the measured LBT failure rate is above a second LBT failure rate threshold, the first UE 505 may determine that the HARQ DTX is caused by the LBT failure. Alternatively, if the measured LBT failure rate is below the second LBT failure rate threshold, the first UE 505 may determine that the HARQ DTX is not caused by the LBT failure.

If the measured SINR, CQI, or RSRQ of the sidelink communication from the second UE 510 is above a second SINR, CQI, or RSRQ threshold (e.g., the sidelink connection satisfies a radio link quality condition), the first UE 505 may determine that the HARQ DTX is caused by the LBT failure. Alternatively, if the measured SINR, CQI, or RSRQ of the sidelink communication from the second UE 510 is below the second SINR, CQI, or RSRQ threshold, the first UE 505 may determine that the HARQ DTX is caused by poor channel condition and not caused by the LBT failure.

If the measured RSRP, CBR or CR of the sidelink communication channel is above a second RSRP, CBR or CR threshold (e.g., the sidelink channel is congested or interfered by other UEs, in other words, the sidelink connection may not satisfy a radio link quality condition), the first UE 505 may determine that the HARQ DTX is caused by poor channel condition and not by the LBT failure. Alternatively, if the received RSRP, CBR or CR of the sidelink communication channel is below the second RSRP, CBR or CR threshold (e.g., the sidelink connection satisfies a radio link quality condition), the first UE 505 may determine that the HARQ DTX is caused by the LBT failure.

If the measured RSSI of the sidelink communication channel is above a second RSSI threshold (e.g., the sidelink connection is interfered by other UEs or Wi-Fi devices), the first UE 505 may determine that the HARQ DTX is caused by the LBT failure if the measured RSRP, CBR or CR is below a second RSRP, CBR or CR threshold (e.g., more Wi-Fi devices); otherwise, the first UE 505 may determine that the HARQ DTX is not caused by the LBT failure if the measured RSRP, CBR or CR is above a second RSRP, CBR or CR threshold (e.g., more UEs).

If the measured the number of consecutive LBT failures is above a second consecutive LBT failures threshold (e.g., the sidelink channel is congested by Wi-Fi devices), the first UE 505 may determine that the HARQ DTX is caused by the LBT failure. Alternatively, if the measured the number of consecutive LBT failures is below a second consecutive LBT failures threshold (e.g., the sidelink channel is not congested by Wi-Fi devices), the first UE 505 may determine that the HARQ DTX is not caused by the LBT failure.

In some aspects, multiple HARQ feedback occasions may be allocated for a transmission or retransmission of a communication. In this case, the first UE 505 may determine a HARQ feedback occasion count by counting a number of ACK or NACKs received at the last HARQ feedback occasion, or the last two HARQ feedback occasions. If the HARQ feedback occasion count is above a HARQ feedback occasion count threshold (e.g., the number of HARQ feedbacks transmitted with failed LBTs till the last or the last second HARQ occasions, in another words, more LBT failures before a successful HARQ feedback is transmitted), the first UE 505 may determine that the HARQ DTX is caused by the LBT failure. Alternatively, if the HARQ feedback occasion count is below the HARQ feedback occasion count threshold, the first UE 505 may determine that the HARQ DTX is not caused by the LBT failure.

In some aspects, the first UE 505 may determine that the HARQ DTX is caused by the LBT failure or not based on any combination of the measured or counted indications described above.

In some aspects, the first UE 505 may determine that the HARQ DTX is caused by the LBT failure or not based on any combination of the received indication from the second UE 510 and the measured or counted indications performed by the first UE 505, as described above.

As shown in connection with reference number 620, the first UE 605 may obtain a second indication, based at least in part on a second threshold, that the HARQ DTX caused by the LBT failure is a type (e.g., a first type) of HARQ DTX that is to be counted for identifying the sidelink RLF.

In some aspects, the second indication may be based at least in part on the received information (e.g., received from the second UE 510 via the MAC CE). For example, the second indication may be based at least in part on the number of consecutive sidelink LBT failures received from the second UE 510 (e.g., the received consecutive LBT failure count). If the received consecutive LBT failure count is above a first consecutive LBT failure count threshold (e.g., consecutive LBT failures may cause disruptions to sidelink communication and thus may be considered for RLF detection), the first UE 505 may determine that the HARQ DTX caused by the LBT failure is the first type of HARQ DTX that should be counted for identifying the RLF. Alternatively, if the received consecutive LBT failure count is below the first consecutive LBT failure count threshold (e.g., consecutive LBT failure may not be significant to sidelink communication and thus may not be considered for RLF detection), the first UE 505 may determine that the HARQ DTX caused by the LBT failure is not the first type of HARQ DTX that should be counted for identifying the RLF. Instead, the first UE 505 may determine that the HARQ DTX caused by the LBT failure is a second type of HARQ DTX that should not be counted for identifying the RLF.

In some aspects, the second indication may be based at least in part on the one or more measurements by the first UE 505. For example, the second indication may be based at least in part on the number of measured consecutive sidelink LBT failures (e.g., the measured consecutive LBT failure count). If the measured consecutive LBT failure count is above a second consecutive LBT failure count threshold (e.g., consecutive LBT failures may cause disruptions to sidelink communication and thus may be considered for RLF detection), the first UE 505 may determine that the HARQ DTX caused by the LBT failure is the first type of HARQ DTX that should be counted for identifying the RLF. Alternatively, if the measured consecutive LBT failure count is below the second consecutive LBT failure count threshold (e.g., consecutive LBT failure may not be significant to sidelink communication and thus may not be considered for RLF detection), the first UE 505 may determine that the HARQ DTX caused by the LBT failure is not the first type of HARQ DTX that should be counted for identifying the RLF. Instead, the first UE 505 may determine that the HARQ DTX caused by the LBT failure is the second type of HARQ DTX that should not be counted for identifying the RLF.

As shown in connection with reference number 630, the first UE 505 may identify the sidelink RLF based at least in part on detecting a number of consecutive the first type of HARQ DTX occurrences. In some aspects, the sidelink unlicensed configuration may indicate a maximum number of consecutive the first type of HARQ DTX occurrences for detecting the RLF. For example, the sidelink unlicensed configuration may indicate a maximum number of three consecutive the first type of HARQ DTX occurrences for detecting the RLF. In this case, after detecting three consecutive the first type of HARQ DTX occurrences, based at least in part on the received information and/or the performed measurements, the first UE 505 may declare the RLF. In contrast, the second type of HARQ DTX occurrences may not count toward the maximum number of consecutive HARQ DTX occurrences for detecting the RLF.

As described above, frequent sidelink RLF detection is undesirable as it may result in communication disruptions and require significant resources for channel recovery. This is particularly true when the sidelink RLF is detected on a channel that does not necessarily have poor channel quality. Using the techniques and apparatuses described herein, the first UE 505 may be able to distinguish between HARQ DTX occurrences that are due to poor channel quality (e.g., failed SCI decoding) and HARQ DTX occurrences that are due to LBT failures. Thus, the number of sidelink RLF detection occurrences may be reduced.

As indicated above, FIG. 6 is provided as an example. Other examples may differ from what is described with respect to FIG. 6.

Figure 7:
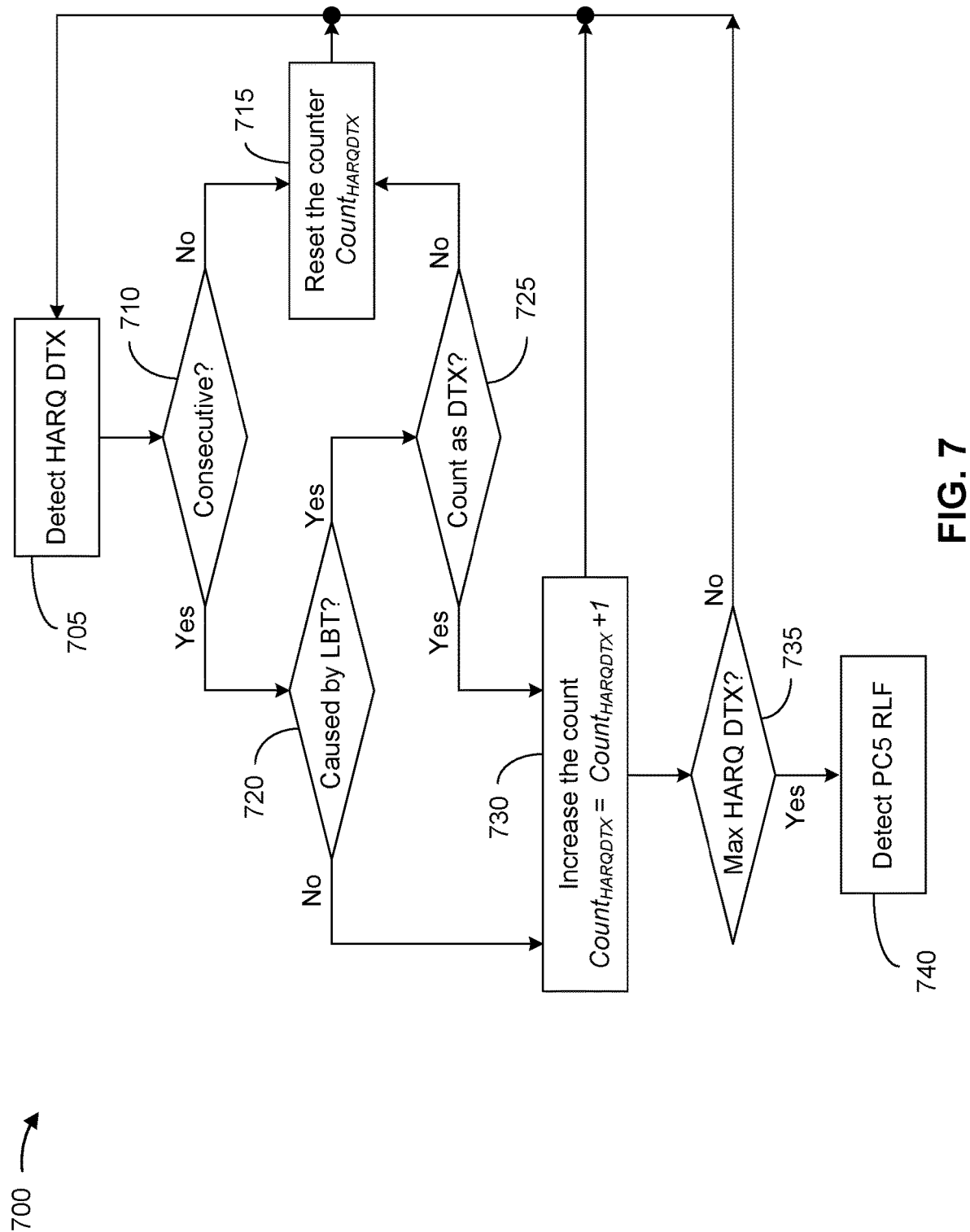
FIG. 7 is a diagram illustrating an example associated with RLF detection using a HARQ DTX timer, in accordance with the present disclosure.

FIG. 7 is a diagram illustrating an example 700 of RLF detection using a HARQ DTX timer, in accordance with the present disclosure.

As shown in connection with reference number 705, the first UE 505 may detect a HARQ DTX (e.g., as described above in connection with reference numbers 515, 520, and 525 of FIG. 5).

As shown in connection with reference number 710, the first UE 505 may determine if the HARQ DTX is a consecutive HARQ DTX.

As shown in connection with reference number 715, if the HARQ DTX is not a consecutive HARQ DTX, the first UE 505 may reset a counter (e.g., $Count_{HARQDTX}$).

As shown in connection with reference number 720, if the HARQ DTX is a consecutive HARQ DTX, the first UE 505 may determine whether the HARQ DTX is caused by LBT. For example, as described above in connection with reference number 620 of FIG. 6, the first UE 505 may determine whether the HARQ DTX is caused by the LBT failure based at least in part on a first LBT success rate threshold, a first LBT failure rate threshold, a first SINR, CQI, or RSRQ threshold, a first RSRP, CBR or CR threshold, a first RSSI threshold, or a first consecutive LBT failure count threshold associated with the received information from the second UE 510, or a second LBT success rate threshold, a second LBT failure rate threshold, a second SINR, CQI, or RSRQ threshold, a second RSRP, CBR or CR threshold, a second RSSI threshold, or a second consecutive LBT failure count threshold, or a HARQ feedback occasion count threshold associated with the measurements performed by the first UE 505.

As shown in connection with reference number 725, if the HARQ DTX is caused by LBT, the first UE 505 may determine whether the HARQ DTX is the first type of HARQ DTX that should be counted toward a maximum number of consecutive HARQ DTX occurrences for detecting an RLF. For example, as described above in connection with reference number 625 of FIG. 6, the first UE 505 may determine whether the number of consecutive the first type HARQ DTX occurrences is greater than a first consecutive LBT failure count threshold associated with the received information, or a second consecutive LBT failure count threshold associated with the measurements performed by the first UE 505.

In some aspects, the determination at 720 and 725 may be conducted jointly with one step, e.g., determining if the HARQ DTX caused by LBT failure is counted for the first type HARQ DTX occurrences.

As shown in connection with reference number 730, if the HARQ DTX is not caused by LBT, or if the HARQ DTX is the first type of HARQ DTX to be counted toward the maximum number of consecutive HARQ DTX occurrences, the first UE 505 may increase the count (e.g., $Count_{HARQDTX}=Count_{HARQDTX}+1$).

As shown in connection with reference number 735, the first UE 505 may determine whether the maximum number of consecutive HARQ DTX occurrences has been reached. For example, as described above in connection with reference number 630 of FIG. 6, the sidelink unlicensed configuration may indicate a maximum number of consecutive the first type of HARQ DTX occurrences for detecting the RLF.

As shown in connection with reference number 740, if the maximum number of consecutive HARQ DTX occurrences has been reached, the first UE 505 may detect (e.g., declare) the PC5 RRC connection RLF. Alternatively, if the maximum number of consecutive HARQ DTX occurrences has not been reached, the first UE 505 may continue to monitor for HARQ DTX occurrences (e.g., as described in connection with reference number 705).

As indicated above, FIG. 7 is provided as an example. Other examples may differ from what is described with respect to FIG. 7.

Figure 8:
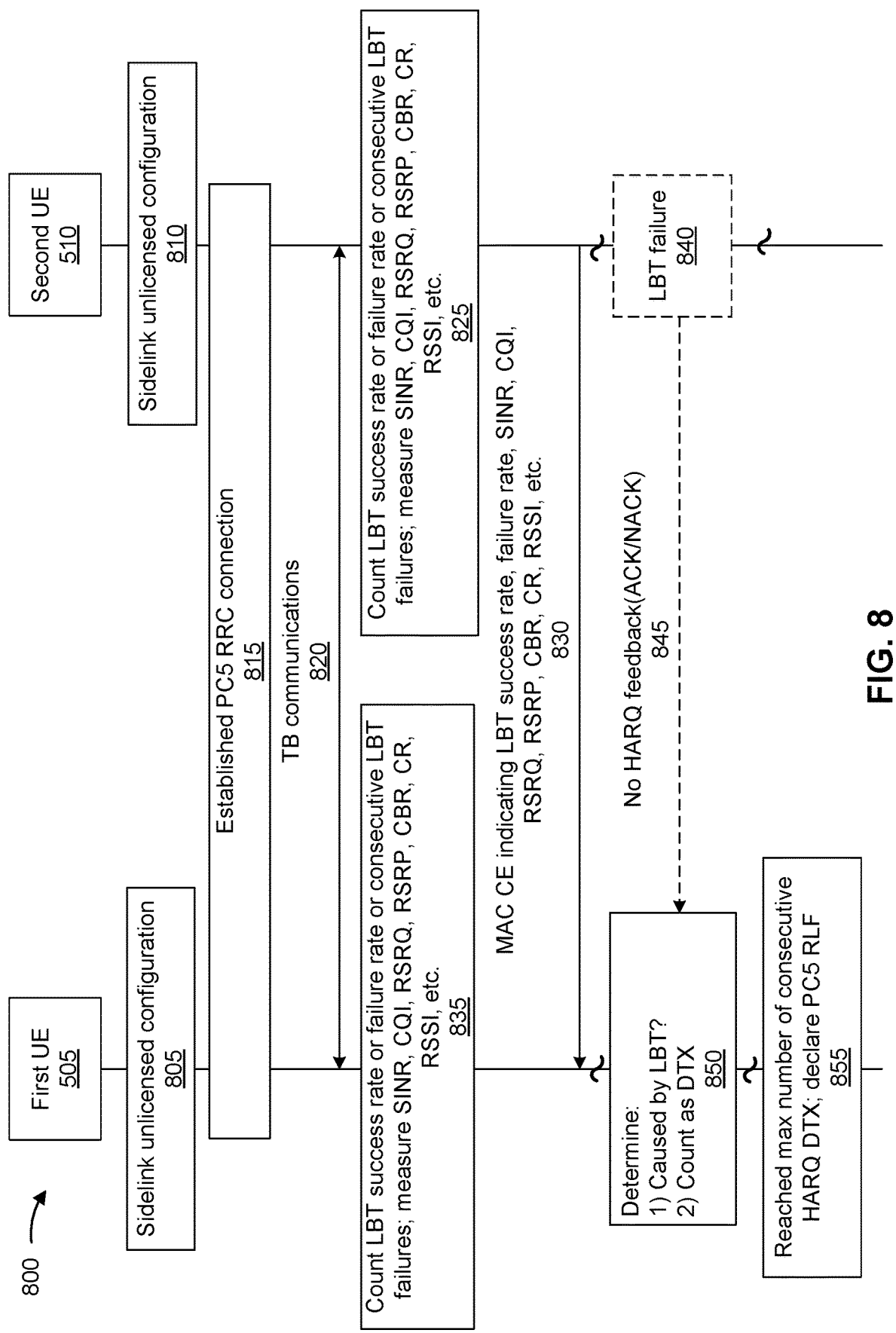
FIG. 8 is a diagram illustrating an example associated with configuration and communications for detecting sidelink RLF, in accordance with the present disclosure.

FIG. 8 is a diagram illustrating an example 800 of configuration and communications for detecting sidelink RLF, in accordance with the present disclosure.

As shown in connection with reference number 805, the first UE 505 may obtain a sidelink unlicensed configuration preconfigured or configured. The sidelink unlicensed configuration may be the sidelink unlicensed configuration described above in connection with reference number 605 of FIG. 6. In some aspects, the sidelink unlicensed configuration may include an indication of one or more of the thresholds described herein.

As shown in connection with reference number 810, the second UE 510 may obtain a sidelink unlicensed configuration preconfigured or configured. The sidelink unlicensed configuration may be the sidelink unlicensed configuration described above in connection with reference number 610 of FIG. 6. In some aspects, the sidelink unlicensed configuration may include an indication of one or more of the thresholds described herein.

As shown in connection with reference number 815, the first UE 505 and the second UE 510 may establish a sidelink (PC5) RRC connection.

As shown in connection with reference number 820, the first UE 505 and the second UE 510 may communicate using the PC5 RRC connection. For example, the first UE 505 may transmit, and the second UE 510 may receive, one or more transport blocks over the PC5 RRC connection. Additionally, or alternatively, the second UE 510 may transmit, and the first UE 505 may receive, one or more transport blocks over the PC5 RRC connection.

As shown in connection with reference number 825, the second UE 510 may measure (e.g., count) the LBT success rate, the LBT failure rate, the SINR, the CQI, the RSRQ, the RSRP, the CBR, the CR, the RSSI, and/or the number of consecutive LBT failures, as described above in connection with reference number 615 of FIG. 6.

As shown in connection with reference number 830, the second UE 510 may transmit, and the first UE 505 may receive, a MAC CE that includes information such as the LBT success rate, the LBT failure rate, the SINR, and/or the number of consecutive LBT failures. In some aspects, the information may be transmitted with other data. In some aspects, the information may be transmitted by itself.

As shown in connection with reference number 835, the first UE 505 may measure the LBT success rate, the LBT failure rate, the SINR, the CQI, the RSRQ, the RSRP, the CBR, the CR, the RSSI, and/or the number of consecutive LBT failures.

As shown in connection with reference number 840, the second UE 510 may experience one or multiple LBT failures at one or multiple HARQ feedback occasions. For example, the second UE 510 may be unable to access the sidelink channel due to the channel being occupied by another UE (e.g., another device using Wi-Fi).

As shown in connection with reference number 845, the second UE 510 may fail to transmit HARQ (e.g., ACK or NACK) feedback. For example, the second UE 510 may experience HARQ DTX. In some aspects, the second UE 510 may fail to transmit the HARQ feedback as a result of one or multiple LBT failures at one or multiple HARQ feedback occasions.

As shown in connection with reference number 850, the first UE 505 may determine whether the HARQ DTX is caused by an LBT failure. As described above in connection with reference number 620 of FIG. 6, the first UE 505 may determine whether the HARQ DTX is caused by the LBT failure based at least in part on a first LBT success rate threshold, a first LBT failure rate threshold, a first SINR, CQI, or RSRQ threshold, a first RSRP, CBR or CR threshold, a first RSSI threshold, or a first consecutive LBT failure count threshold associated with the received information from the second UE 510 at 830, or a second LBT success rate threshold, a second LBT failure rate threshold, a second SINR, CQI, or RSRQ threshold, a second RSRP, CBR or CR threshold, a second RSSI threshold, or a second consecutive LBT failure count threshold, or a HARQ feedback occasion count threshold associated with the measurements performed by the first UE 505. Additionally, the first UE 505 may determine whether the HARQ DTX is a first type of HARQ DTX that should be counted toward a maximum number of consecutive HARQ DTX occurrences for detecting an RLF. For example, the first UE 505 may determine whether the number of consecutive LBT failures is greater than a first consecutive LBT failure count threshold associated with the received information from the second UE 510 at 830, or a second consecutive LBT failure count threshold associated with the measurements performed by the first UE 505.

As shown in connection with reference number 855, the first UE 505 may determine whether the number of consecutive the first type of HARQ DTX occurrences is greater than, or greater than or equal to, the maximum number of consecutive HARQ DTX occurrences for detecting the RLF. If the number of consecutive the first type of HARQ DTX occurrences is greater than, or greater than or equal to, the maximum number of consecutive HARQ DTX occurrences for detecting the RLF, the first UE 505 may declare the RLF. Alternatively, if the number of consecutive the first type of HARQ DTX occurrences is less than the maximum number of consecutive HARQ DTX occurrences for detecting the RLF, the first UE 505 may not declare the RLF.

As indicated above, FIG. 8 is provided as an example. Other examples may differ from what is described with respect to FIG. 8.

Figure 9:
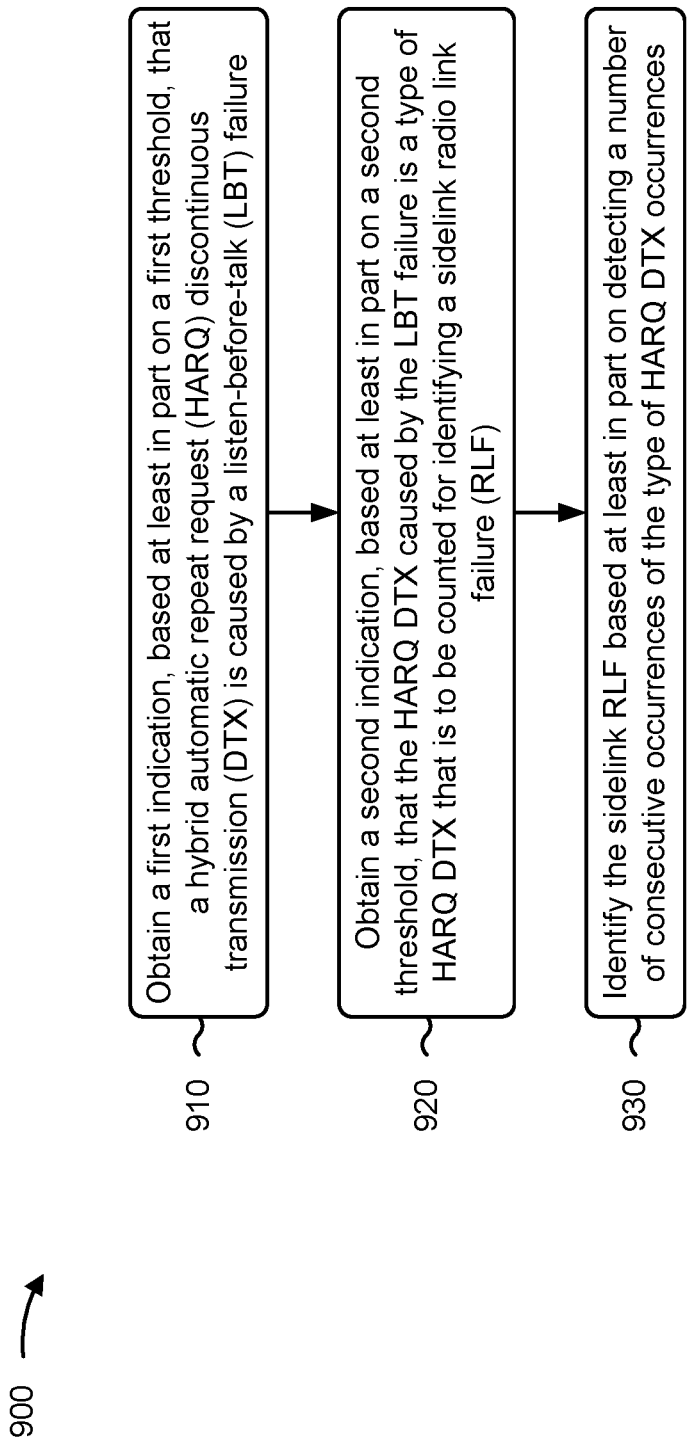
FIG. 9 is a diagram illustrating an example process associated with sidelink RLF detection, in accordance with the present disclosure.

FIG. 9 is a diagram illustrating an example process 900 performed, for example, by a UE, in accordance with the present disclosure. Example process 900 is an example where the UE (e.g., UE 120) performs operations associated with sidelink RLF detection.

As shown in FIG. 9, in some aspects, process 900 may include obtaining a first indication, based at least in part on a first threshold, that a HARQ DTX is caused by an LBT failure (block 910). For example, the UE (e.g., using communication manager 140 and/or obtaining component 1108, depicted in FIG. 11) may obtain a first indication, based at least in part on a first threshold, that a HARQ DTX is caused by an LBT failure, as described above.

As further shown in FIG. 9, in some aspects, process 900 may include obtaining a second indication, based at least in part on a second threshold, that the HARQ DTX caused by the LBT failure is a type of HARQ DTX that is to be counted for identifying a sidelink RLF (block 920). For example, the UE (e.g., using communication manager 140 and/or obtaining component 1108, depicted in FIG. 11) may obtain a second indication, based at least in part on a second threshold, that the HARQ DTX caused by the LBT failure is a type of HARQ DTX that is to be counted for identifying a sidelink RLF, as described above.

As further shown in FIG. 9, in some aspects, process 900 may include identifying the sidelink RLF based at least in part on detecting a number of consecutive the type of HARQ DTX occurrences (block 930). For example, the UE (e.g., using communication manager 140 and/or identification component 1110, depicted in FIG. 11) may identify the sidelink RLF based at least in part on detecting a number of consecutive the type of HARQ DTX occurrences, as described above.

Process 900 may include additional aspects, such as any single aspect or any combination of aspects described below and/or in connection with one or more other processes described elsewhere herein.

In a first aspect, process 900 includes receiving a sidelink medium access control message that indicates an LBT success rate, wherein obtaining the first indication, based at least in part on the first threshold, that the HARQ DTX is caused by the LBT failure comprises determining that the LBT success rate is less than a first LBT success rate threshold.

In a second aspect, alone or in combination with the first aspect, process 900 includes receiving a sidelink medium access control message that indicates an LBT failure rate, wherein obtaining the first indication, based at least in part on the first threshold, that the HARQ DTX is caused by the LBT failure comprises determining that the LBT failure rate is greater than a first LBT failure rate threshold.

In a third aspect, alone or in combination with one or more of the first and second aspects, process 900 includes receiving a sidelink medium access control message that indicates an SINR, a CQI, an RSRQ, an RSRP, a CBR, a CR, or a RSSI associated with a sidelink connection, wherein obtaining the first indication, based at least in part on the first threshold, that the HARQ DTX is caused by the LBT failure comprises determining that the SINR associated with the sidelink connection is greater than a first SINR threshold, a first CQI threshold, a first RSRQ threshold, a first RSRP threshold, a first CBR threshold, a first CR threshold, or a first RSSI threshold.

In a fourth aspect, alone or in combination with one or more of the first through third aspects, process 900 includes identifying an LBT success rate, wherein obtaining the first indication, based at least in part on the first threshold, that the HARQ DTX is caused by the LBT failure comprises determining that the LBT success rate is less than a second LBT success rate threshold.

In a fifth aspect, alone or in combination with one or more of the first through fourth aspects, process 900 includes identifying an LBT failure rate, wherein obtaining the first indication, based at least in part on the first threshold, that the HARQ DTX is caused by the LBT failure comprises determining that the LBT failure rate is greater than a second LBT failure rate threshold.

In a sixth aspect, alone or in combination with one or more of the first through fifth aspects, process 900 includes identifying an SINR, a CQI, an RSRQ, an RSRP, a CBR, a CR, or an RSSI associated with a sidelink connection, wherein obtaining the first indication, based at least in part on the first threshold, that the HARQ DTX is caused by the LBT failure comprises determining that the SINR associated with the sidelink connection is greater than a second SINR threshold, a second CQI threshold, a second RSRQ threshold, a second RSRP threshold, a second CBR threshold, a second CR threshold, or a second RSSI threshold.

In a seventh aspect, alone or in combination with one or more of the first through sixth aspects, process 900 includes identifying a number of ACK or NACK messages associated with one or more HARQ feedback occasions of a plurality of HARQ feedback occasions, wherein obtaining the first indication, based at least in part on the first threshold, that the HARQ DTX is caused by the LBT failure comprises determining that the number of ACK or NACK messages associated with the one or more HARQ feedback occasions is greater than a HARQ feedback occasion threshold.

In an eighth aspect, alone or in combination with one or more of the first through seventh aspects, process 900 includes receiving a sidelink medium access control message that indicates a number of consecutive LBT failures, wherein obtaining the second indication, based at least in part on the second threshold, that the HARQ DTX caused by the LBT failure is the type of HARQ DTX that is to be counted for identifying the sidelink RLF comprises determining that the number of consecutive LBT failures is greater than a first consecutive LBT failure threshold.

In a ninth aspect, alone or in combination with one or more of the first through eighth aspects, process 900 includes identifying a number of consecutive LBT failures, wherein obtaining the second indication, based at least in part on the second threshold, that the HARQ DTX caused by the LBT failure is the type of HARQ DTX that is to be counted for identifying the sidelink RLF comprises determining that the number of consecutive LBT failures is greater than a second consecutive LBT failure threshold.

In a tenth aspect, alone or in combination with one or more of the first through ninth aspects, process 900 includes obtaining a sidelink unlicensed configuration that indicates at least one of the first threshold, the second threshold, or a maximum number of consecutive the type of HARQ DTX occurrences for identifying the sidelink RLF.

In an eleventh aspect, alone or in combination with one or more of the first through tenth aspects, identifying the sidelink RLF based at least in part on detecting the number of consecutive the type of HARQ DTX occurrences comprises determining that the number of consecutive the type of HARQ DTX occurrences is greater than a maximum number of HARQ DTX occurrences for identifying the sidelink RLF.

In a twelfth aspect, alone or in combination with one or more of the first through eleventh aspects, process 900 includes transmitting an indication of the sidelink RLF based at least in part on the number of consecutive the type of HARQ DTX occurrences being greater than the maximum number of HARQ DTX occurrences for identifying the sidelink RLF.

In a thirteenth aspect, alone or in combination with one or more of the first through twelfth aspects, process 900 includes determining, based at least in part on the second threshold, that an other HARQ DTX caused by the LBT failure is an other type of HARQ DTX that is not to be counted for identifying the sidelink RLF, and resetting a counter associated with counting a number of consecutive HARQ DTX occurrences.

In a fourteenth aspect, alone or in combination with one or more of the first through thirteenth aspects, the HARQ DTX comprises a scheduled acknowledgement message or negative acknowledgement message that is not received by the UE.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
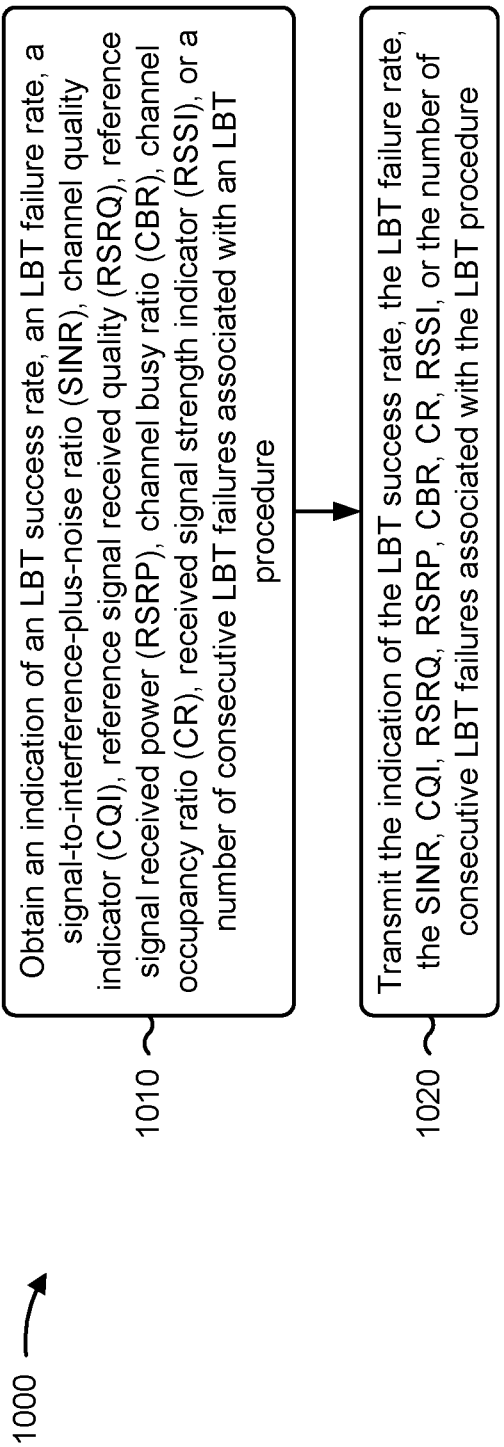
FIG. 10 is a diagram illustrating an example process associated with sidelink RLF detection, in accordance with the present disclosure.

FIG. 10 is a diagram illustrating an example process 1000 performed, for example, by a UE, in accordance with the present disclosure. Example process 1000 is an example where the UE (e.g., UE 120) performs operations associated with sidelink RLF detection.

As shown in FIG. 10, in some aspects, process 1000 may include obtaining an indication of an LBT success rate, an LBT failure rate, an SINR, or a number of consecutive LBT failures associated with an LBT procedure (block 1010). For example, the UE (e.g., using communication manager 140 and/or obtaining component 1108, depicted in FIG. 11) may obtain an indication of an LBT success rate, an LBT failure rate, an SINR, or a number of consecutive LBT failures associated with an LBT procedure, as described above.

As further shown in FIG. 10, in some aspects, process 1000 may include transmitting the indication of the LBT success rate, the LBT failure rate, the SINR, the CQI, the RSRQ, the RSRP, the CBR, the CR, the RSSI, or the number of consecutive LBT failures associated with the LBT procedure (block 1020). For example, the UE (e.g., using communication manager 140 and/or transmission component 1104, depicted in FIG. 11) may transmit the indication of the LBT success rate, the LBT failure rate, the SINR, the CQI, the RSRQ, the RSRP, the CBR, the CR, the RSSI, or the number of consecutive LBT failures associated with the LBT procedure, as described above.

Process 1000 may include additional aspects, such as any single aspect or any combination of aspects described below and/or in connection with one or more other processes described elsewhere herein.

In a first aspect, transmitting the indication comprises transmitting, to an other UE, a sidelink medium access control message that includes the indication of the LBT success rate, the LBT failure rate, the SINR, the CQI, the RSRQ, the RSRP, the CBR, the CR, the RSSI, or the number of consecutive LBT failures associated with the LBT procedure.

In a second aspect, alone or in combination with the first aspect, process 1000 includes obtaining a sidelink unlicensed configuration for the UE.

In a third aspect, alone or in combination with one or more of the first and second aspects, the indication of the LBT success rate, the LBT failure rate, the SINR, the CQI, the RSRQ, the RSRP, the CBR, the CR, the RSSI, or the number of consecutive LBT failures associated with the LBT procedure is transmitted with other data.

In a fourth aspect, alone or in combination with one or more of the first through third aspects, the indication of the LBT success rate, the LBT failure rate, the SINR, the CQI, the RSRQ, the RSRP, the CBR, the CR, the RSSI, or the number of consecutive LBT failures associated with the LBT procedure is transmitted without other data.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
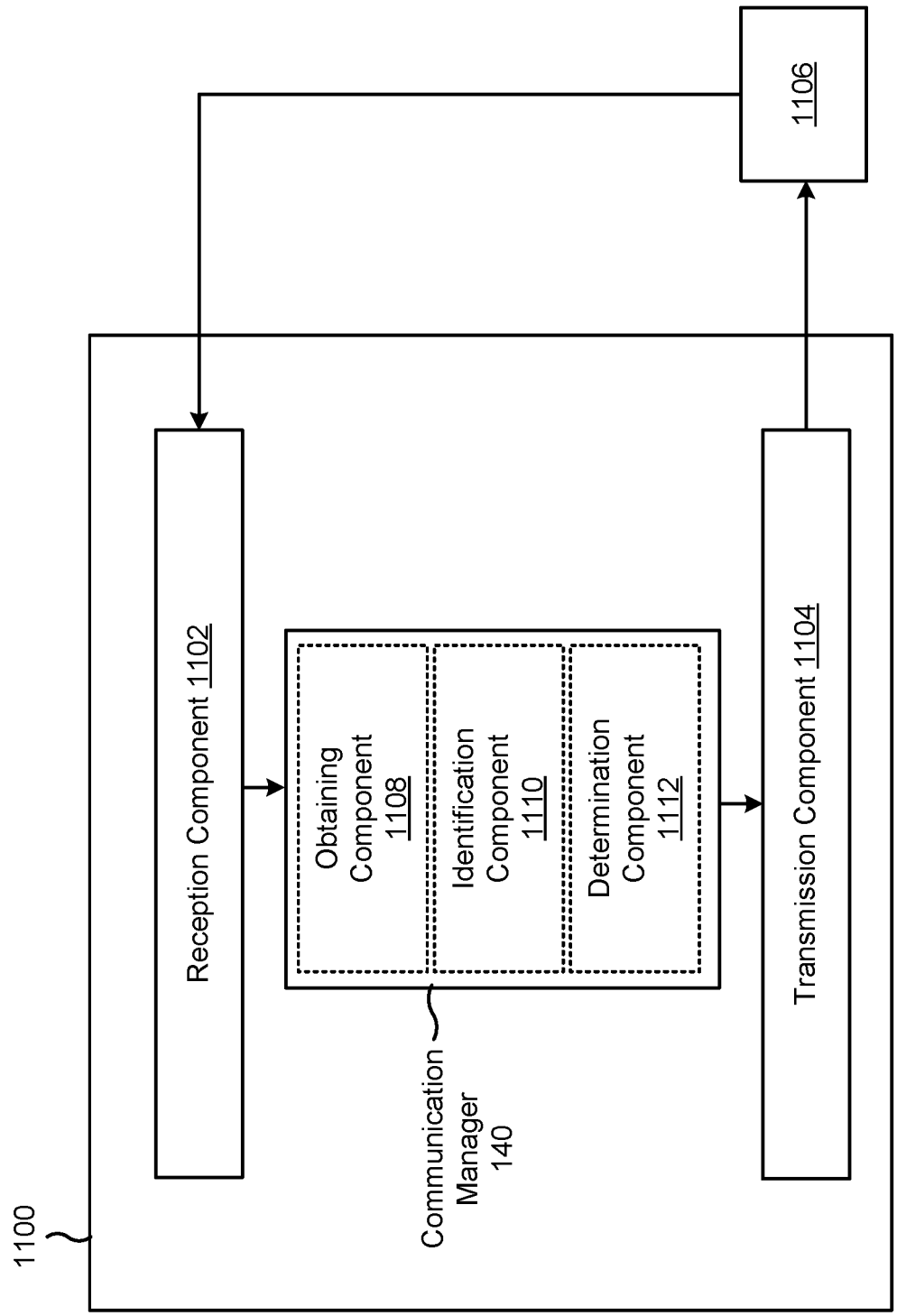
FIG. 11 is a diagram of an example apparatus for wireless communication, in accordance with the present disclosure.

FIG. 11 is a diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include one or more of an obtaining component 1108, an identification component 1110, a determination component 1112, or a counting component 1112, among other examples.

In some aspects, the apparatus 1100 may be configured to perform one or more operations described herein in connection with FIGS. 6-8. Additionally, or alternatively, the apparatus 1100 may be configured to perform one or more processes described herein, such as process 900 of FIG. 9, process 1000 of FIG. 10, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The obtaining component 1108 may obtain a first indication, based at least in part on a first threshold, that a HARQ DTX is caused by an LBT failure. The obtaining component 1108 may obtain a second indication, based at least in part on a second threshold, that the HARQ DTX caused by the LBT failure is a type of HARQ DTX that is to be counted for identifying a sidelink RLF. The identification component 1110 may identify the sidelink RLF based at least in part on detecting a number of consecutive the type of HARQ DTX occurrences.

The reception component 1102 may receive a sidelink medium access control message that indicates an LBT success rate, wherein obtaining the first indication, based at least in part on the first threshold, that the HARQ DTX is caused by the LBT failure comprises determining that the LBT success rate is less than a first LBT success rate threshold.

The reception component 1102 may receive a sidelink medium access control message that indicates an LBT failure rate, wherein obtaining the first indication, based at least in part on the first threshold, that the HARQ DTX is caused by the LBT failure comprises determining that the LBT failure rate is greater than a first LBT failure rate threshold.

The reception component 1102 may receive a sidelink medium access control message that indicates an SINR, a CQI, an RSRQ, an RSRP, a CBR, a CR, or an RSSI associated with a sidelink connection, wherein obtaining the first indication, based at least in part on the first threshold, that the HARQ DTX is caused by the LBT failure comprises determining that the SINR associated with the sidelink connection is greater than a first SINR threshold, a first CQI threshold, a first RSRQ threshold, a first RSRP threshold, a first CBR threshold, a first CR threshold, or a first RSSI threshold.

The identification component 1110 may identify an LBT success rate, wherein obtaining the first indication, based at least in part on the first threshold, that the HARQ DTX is caused by the LBT failure comprises determining that the LBT success rate is less than a second LBT success rate threshold.

The identification component 1110 may identify an LBT failure rate, wherein obtaining the first indication, based at least in part on the first threshold, that the HARQ DTX is caused by the LBT failure comprises determining that the LBT failure rate is greater than a second LBT failure rate threshold.

The identification component 1110 may identify an SINR, a CQI, an RSRQ, an RSRP, a CBR, a CR, or an RSSI associated with a sidelink connection, wherein obtaining the first indication, based at least in part on the first threshold, that the HARQ DTX is caused by the LBT failure comprises determining that the SINR associated with the sidelink connection is greater than a second SINR threshold, a second CQI threshold, a second RSRQ threshold, a second RSRP threshold, a second CBR threshold, a second CR threshold, or a second RSSI threshold.

The identification component 1110 may identify a number of ACK or NACK messages associated with one or more HARQ feedback occasions of a plurality of HARQ feedback occasions, wherein obtaining the first indication, based at least in part on the first threshold, that the HARQ DTX is caused by the LBT failure comprises determining that the number of ACK or NACK messages associated with the one or more HARQ feedback occasions is greater than a HARQ feedback occasion threshold.

The reception component 1102 may receive a sidelink medium access control message that indicates a number of consecutive LBT failures, wherein obtaining the second indication, based at least in part on the second threshold, that the HARQ DTX caused by the LBT failure is the type of HARQ DTX that is to be counted for identifying the sidelink RLF comprises determining that the number of consecutive LBT failures is greater than a first consecutive LBT failure threshold.

The identification component 1110 may identify a number of consecutive LBT failures, wherein obtaining the second indication, based at least in part on the second threshold, that the HARQ DTX caused by the LBT failure is the type of HARQ DTX that is to be counted for identifying the sidelink RLF comprises determining that the number of consecutive LBT failures is greater than a second consecutive LBT failure threshold.

The obtaining component 1108 may obtain a sidelink unlicensed configuration that indicates at least one of the first threshold, the second threshold, or a maximum number of consecutive the type of HARQ DTX occurrences for identifying the sidelink RLF.

The transmission component 1104 may transmit an indication of the sidelink RLF based at least in part on the number of consecutive the type of HARQ DTX occurrences being greater than the maximum number of HARQ DTX occurrences for identifying the sidelink RLF.

The determination component 1112 may determine, based at least in part on the second threshold, that an other HARQ DTX caused by the LBT failure is an other type of HARQ DTX that is not to be counted for identifying the sidelink RLF.

The obtaining component 1108 may obtain an indication of an LBT success rate, an LBT failure rate, an SINR, or a number of consecutive LBT failures associated with an LBT procedure. The transmission component 1104 may transmit the indication of the LBT success rate, the LBT failure rate, the SINR, the CQI, the RSRQ, the RSRP, the CBR, the CR, the RSSI, or the number of consecutive LBT failures associated with the LBT procedure.

The obtaining component 1108 may obtain a sidelink unlicensed configuration for the UE.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: obtaining a first indication, based at least in part on a first threshold, that a hybrid automatic repeat request (HARQ) discontinuous transmission (DTX) is caused by a listen-before-talk (LBT) failure; obtaining a second indication, based at least in part on a second threshold, that the HARQ DTX caused by the LBT failure is a type of HARQ DTX that is to be counted for identifying a sidelink radio link failure (RLF); and identifying the sidelink RLF based at least in part on detecting a number of consecutive the type of HARQ DTX occurrences.

Aspect 2: The method of Aspect 1, further comprising: receiving a sidelink medium access control message that indicates an LBT success rate, wherein obtaining the first indication, based at least in part on the first threshold, that the HARQ DTX is caused by the LBT failure comprises determining that the LBT success rate is less than a first LBT success rate threshold.

Aspect 3: The method of any of Aspects 1-2, further comprising: receiving a sidelink medium access control message that indicates an LBT failure rate, wherein obtaining the first indication, based at least in part on the first threshold, that the HARQ DTX is caused by the LBT failure comprises determining that the LBT failure rate is greater than a first LBT failure rate threshold.

Aspect 4: The method of any of Aspects 1-3, further comprising: receiving a sidelink medium access control message that indicates a signal-to-interference-plus-noise ratio (SINR), a channel quality indicator (CQI), a reference signal received quality (RSRQ), a reference signal received power (RSRP), a channel busy ratio (CBR), a channel occupancy ratio (CR), or a received signal strength indicator (RSSI) associated with a sidelink connection, wherein obtaining the first indication, based at least in part on the first threshold, that the HARQ DTX is caused by the LBT failure comprises determining that the SINR associated with the sidelink connection is greater than a first SINR threshold, a first CQI threshold, a first RSRQ threshold, a first RSRP threshold, a first CBR threshold, a first CR threshold, or a first RSSI threshold.

Aspect 5: The method of any of Aspects 1-4, further comprising: identifying an LBT success rate, wherein obtaining the first indication, based at least in part on the first threshold, that the HARQ DTX is caused by the LBT failure comprises determining that the LBT success rate is less than a second LBT success rate threshold.

Aspect 6: The method of any of Aspects 1-5, further comprising: identifying an LBT failure rate, wherein obtaining the first indication, based at least in part on the first threshold, that the HARQ DTX is caused by the LBT failure comprises determining that the LBT failure rate is greater than a second LBT failure rate threshold.

Aspect 7: The method of any of Aspects 1-6, further comprising: identifying a signal-to-interference-plus-noise ratio (SINR) associated with a sidelink connection, wherein obtaining the first indication, based at least in part on the first threshold, that the HARQ DTX is caused by the LBT failure comprises determining that the SINR associated with the sidelink connection is greater than a second SINR threshold, a second CQI threshold, a second RSRQ threshold, a second RSRP threshold, a second CBR threshold, a second CR threshold, or a second RSSI threshold.

Aspect 8: The method of any of Aspects 1-7, further comprising: identifying a number of acknowledgement (ACK) or negative acknowledgement (NACK) messages associated with one or more HARQ feedback occasions of a plurality of HARQ feedback occasions, wherein obtaining the first indication, based at least in part on the first threshold, that the HARQ DTX is caused by the LBT failure comprises determining that the number of ACK or NACK messages associated with the one or more HARQ feedback occasions is greater than a HARQ feedback occasion threshold.

Aspect 9: The method of any of Aspects 1-8, further comprising: receiving a sidelink medium access control message that indicates a number of consecutive LBT failures, wherein obtaining the second indication, based at least in part on the second threshold, that the HARQ DTX caused by the LBT failure is the type of HARQ DTX that is to be counted for identifying the sidelink RLF comprises determining that the number of consecutive LBT failures is greater than a first consecutive LBT failure threshold.

Aspect 10: The method of any of Aspects 1-9, further comprising: identifying a number of consecutive LBT failures, wherein obtaining the second indication, based at least in part on the second threshold, that the HARQ DTX caused by the LBT failure is the type of HARQ DTX that is to be counted for identifying the sidelink RLF comprises determining that the number of consecutive LBT failures is greater than a second consecutive LBT failure threshold.

Aspect 11: The method of any of Aspects 1-10, further comprising obtaining a sidelink unlicensed configuration that indicates at least one of the first threshold, the second threshold, or a maximum number of consecutive the type of HARQ DTX occurrences for identifying the sidelink RLF.

Aspect 12: The method of any of Aspects 1-11, wherein identifying the sidelink RLF based at least in part on detecting the number of consecutive the type of HARQ DTX occurrences comprises determining that the number of consecutive the type of HARQ DTX occurrences is greater than a maximum number of consecutive HARQ DTX occurrences for identifying the sidelink RLF.

Aspect 13: The method of Aspect 12, further comprising transmitting an indication of the sidelink RLF based at least in part on the number of consecutive the type of HARQ DTX occurrences being greater than the maximum number of HARQ DTX occurrences for identifying the sidelink RLF.

Aspect 14: The method of any of Aspects 1-13, further comprising: determining, based at least in part on the second threshold, that an other HARQ DTX caused by the LBT failure is an other type of HARQ DTX that is not to be counted for identifying the sidelink RLF; and resetting a counter associated with counting a number of consecutive HARQ DTX occurrences.

Aspect 15: The method of any of Aspects 1-14, wherein the HARQ DTX comprises a scheduled acknowledgement message or negative acknowledgement message that is not received by the UE.

Aspect 16: A method of wireless communication performed by a user equipment (UE), comprising: obtaining an indication of a listen-before-talk (LBT) success rate, an LBT failure rate, a signal-to-interference-plus-noise ratio (SINR), a channel quality indicator (CQI), a reference signal received quality (RSRQ), a reference signal received power (RSRP), a channel busy ratio (CBR), a channel occupancy ratio (CR), a received signal strength indicator (RSSI), or a number of consecutive LBT failures associated with an LBT procedure; and transmitting the indication of the LBT success rate, the LBT failure rate, the SINR, the CQI, the RSRQ, the RSRP, the CBR, the CR, the RSSI, or the number of consecutive LBT failures associated with the LBT procedure.

Aspect 17: The method of Aspect 16, wherein transmitting the indication comprises transmitting, to an other UE, a sidelink medium access control message that includes the indication of the LBT success rate, the LBT failure rate, the SINR, the CQI, the RSRQ, the RSRP, the CBR, the CR, the RSSI, or the number of consecutive LBT failures associated with the LBT procedure.

Aspect 18: The method of any of Aspects 16-17, further comprising obtaining a sidelink unlicensed configuration for the UE.

Aspect 19: The method of any of Aspects 16-18, wherein the indication of the LBT success rate, the LBT failure rate, the SINR, the CQI, the RSRQ, the RSRP, the CBR, the CR, the RSSI, or the number of consecutive LBT failures associated with the LBT procedure is transmitted with other data.

Aspect 20: The method of any of Aspects 16-19, wherein the indication of the LBT success rate, the LBT failure rate, the SINR, the CQI, the RSRQ, the RSRP, the CBR, the CR, the RSSI, or the number of consecutive LBT failures associated with the LBT procedure is transmitted without other data.

Aspect 21: An apparatus for wireless communication at a device, comprising a processor; memory coupled with the processor; and instructions stored in the memory and executable by the processor to cause the apparatus to perform the method of one or more of Aspects 1-15.

Aspect 22: A device for wireless communication, comprising a memory and one or more processors coupled to the memory, the one or more processors configured to perform the method of one or more of Aspects 1-15.

Aspect 23: An apparatus for wireless communication, comprising at least one means for performing the method of one or more of Aspects 1-15.

Aspect 24: A non-transitory computer-readable medium storing code for wireless communication, the code comprising instructions executable by a processor to perform the method of one or more of Aspects 1-15.

Aspect 25: A non-transitory computer-readable medium storing a set of instructions for wireless communication, the set of instructions comprising one or more instructions that, when executed by one or more processors of a device, cause the device to perform the method of one or more of Aspects 1-15.

Aspect 26: An apparatus for wireless communication at a device, comprising a processor; memory coupled with the processor; and instructions stored in the memory and executable by the processor to cause the apparatus to perform the method of one or more of Aspects 16-20.

Aspect 27: A device for wireless communication, comprising a memory and one or more processors coupled to the memory, the one or more processors configured to perform the method of one or more of Aspects 16-20.

Aspect 28: An apparatus for wireless communication, comprising at least one means for performing the method of one or more of Aspects 16-20.

Aspect 29: A non-transitory computer-readable medium storing code for wireless communication, the code comprising instructions executable by a processor to perform the method of one or more of Aspects 16-20.

Aspect 30: A non-transitory computer-readable medium storing a set of instructions for wireless communication, the set of instructions comprising one or more instructions that, when executed by one or more processors of a device, cause the device to perform the method of one or more of Aspects 16-20.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
    one or more memories; and
    one or more processors, coupled to the one or more memories, configured to:
        obtain a first indication, based at least in part on a first threshold, that a hybrid automatic repeat request (HARQ) discontinuous transmission (DTX) is caused by a listen-before-talk (LBT) failure;
        obtain a second indication, based at least in part on a second threshold, that the HARQ DTX caused by the LBT failure is a type of HARQ DTX that is to be counted for identifying a sidelink radio link failure (RLF); and
        identify the sidelink RLF based at least in part on detecting a number of consecutive occurrences of the type of HARQ DTX occurrences.

2. The apparatus of claim 1, wherein the one or more processors are further configured to:
    receive a sidelink medium access control message that indicates an LBT success rate,
        wherein the one or more processors, to obtain the first indication, based at least in part on the first threshold, that the HARQ DTX is caused by the LBT failure, are configured to determine that the LBT success rate is less than a first LBT success rate threshold.

3. The apparatus of claim 1, wherein the one or more processors are further configured to:
    receive a sidelink medium access control message that indicates an LBT failure rate,
        wherein the one or more processors, to obtain the first indication, based at least in part on the first threshold, that the HARQ DTX is caused by the LBT failure, are configured to determine that the LBT failure rate is greater than a first LBT failure rate threshold.

4. The apparatus of claim 1, wherein the one or more processors are further configured to:
  receive a sidelink medium access control message that indicates a signal-to-interference-plus-noise ratio (SINR), a channel quality indicator (CQI), a reference signal received quality (RSRQ), a reference signal received power (RSRP), a channel busy ratio (CBR), a channel occupancy ratio (CR), or a received signal strength indicator (RSSI) associated with a sidelink connection,
    wherein the one or more processors, to obtain the first indication, based at least in part on the first threshold, that the HARQ DTX is caused by the LBT failure, are configured to determine that the SINR associated with the sidelink connection is greater than a first SINR threshold, a first CQI threshold, a first RSRQ threshold, a first RSRP threshold, a first CBR threshold, a first CR threshold, or a first RSSI threshold.

5. The apparatus of claim 1, wherein the one or more processors are further configured to:
  identify an LBT success rate,
    wherein the one or more processors, to obtain the first indication, based at least in part on the first threshold, that the HARQ DTX is caused by the LBT failure, are configured to determine that the LBT success rate is less than a second LBT success rate threshold.

6. The apparatus of claim 1, wherein the one or more processors are further configured to:
  identify an LBT failure rate,
    wherein the one or more processors, to obtain the first indication, based at least in part on the first threshold, that the HARQ DTX is caused by the LBT failure, are configured to determine that the LBT failure rate is greater than a second LBT failure rate threshold.

7. The apparatus of claim 1, wherein the one or more processors are further configured to:
  identify a signal-to-interference-plus-noise ratio (SINR), a channel quality indicator (CQI), a reference signal received quality (RSRQ), a reference signal received power (RSRP), a channel busy ratio (CBR), a channel occupancy ratio (CR), or a received signal strength indicator (RSSI) associated with a sidelink connection,
    wherein the one or more processors, to obtain the first indication, based at least in part on the first threshold, that the HARQ DTX is caused by the LBT failure, are configured to determine that the SINR associated with the sidelink connection is greater than a second SINR threshold, a second CQI threshold, a second RSRQ threshold, a second RSRP threshold, a second CBR threshold, a second CR threshold, or a second RSSI threshold.

8. The apparatus of claim 1, wherein the one or more processors are further configured to:
  identify a number of acknowledgement (ACK) or negative acknowledgement (NACK) messages associated with one or more HARQ feedback occasions of a plurality of HARQ feedback occasions,
    wherein the one or more processors, to obtain the first indication, based at least in part on the first threshold, that the HARQ DTX is caused by the LBT failure, are configured to determine that the number of ACK or NACK messages associated with the one or more HARQ feedback occasions is greater than a HARQ feedback occasion threshold.

9. The apparatus of claim 1, wherein the one or more processors are further configured to:
  receive a sidelink medium access control message that indicates a number of consecutive LBT failures,
    wherein the one or more processors, to obtain the second indication, based at least in part on the second threshold, that the HARQ DTX caused by the LBT failure is the type of HARQ DTX that is to be counted for identifying the sidelink RLF, are configured to determine that the number of consecutive LBT failures is greater than a first consecutive LBT failure threshold.

10. The apparatus of claim 1, wherein the one or more processors are further configured to:
  identify a number of consecutive LBT failures,
    wherein the one or more processors, to obtain the second indication, based at least in part on the second threshold, that the HARQ DTX caused by the LBT failure is the type of HARQ DTX that is to be counted for identifying the sidelink RLF, are configured to determine that the number of consecutive LBT failures is greater than a second consecutive LBT failure threshold.

11. The apparatus of claim 1, wherein the one or more processors are further configured to obtain a sidelink unlicensed configuration that indicates at least one of the first threshold, the second threshold, or a maximum consecutive number of the type of HARQ DTX occurrences for identifying the sidelink RLF.

12. The apparatus of claim 1, wherein the one or more processors, to identify the sidelink RLF based at least in part on detecting the number of consecutive occurrences of the type of HARQ DTX occurrences, are configured to determine that the number of consecutive occurrences of the type of HARQ DTX occurrences is greater than a maximum consecutive number of HARQ DTX occurrences for identifying the sidelink RLF.

13. The apparatus of claim 12, wherein the one or more processors are further configured to transmit an indication of the sidelink RLF based at least in part on the number of consecutive occurrences of the type of HARQ DTX occurrences being greater than the consecutive maximum number of HARQ DTX occurrences for identifying the sidelink RLF.

14. The apparatus of claim 1, wherein the one or more processors are further configured to:
  determine, based at least in part on the second threshold, that an other HARQ DTX caused by the LBT failure is an other type of HARQ DTX that is not to be counted for identifying the sidelink RLF; and
  reset a counter associated with counting a number of consecutive HARQ DTX occurrences.

15. An apparatus for wireless communication at a user equipment (UE), comprising:
  one or more memories; and
  one or more processors, coupled to the one or more memories, configured to:
    obtain, for an other UE, an indication of a listen-before-talk (LBT) success rate, an LBT failure rate, a signal-to-interference-plus-noise ratio (SINR), a channel quality indicator (CQI), a reference signal received quality (RSRQ), a reference signal received power (RSRP), a channel busy ratio (CBR), a channel occupancy ratio (CR), a received signal strength indicator (RSSI), or a number of consecutive LBT failures associated with an LBT procedure; and
    transmit, to the other UE and in a media access control (MAC) control element, the indication of the LBT success rate, the LBT failure rate, the SINR, the CQI, the RSRQ, the RSRP, the CBR, the CR, the RSSI, or the number of consecutive LBT failures associated with the LBT procedure.

16. The apparatus of claim 15, wherein the one or more processors, to transmit the indication, are configured to transmit, to an other UE, a sidelink message comprising the MAC control element that includes the indication of the LBT success rate, the LBT failure rate, the SINR, the CQI, the RSRQ, the RSRP, the CBR, the CR, the RSSI, or the number of consecutive LBT failures associated with the LBT procedure.

17. The apparatus of claim 15, wherein the one or more processors are further configured to obtain a sidelink unlicensed configuration for the UE.

18. The apparatus of claim 15, wherein the indication of the LBT success rate, the LBT failure rate, the SINR, the CQI, the RSRQ, the RSRP, the CBR, the CR, the RSSI, or the number of consecutive LBT failures associated with the LBT procedure is transmitted with other data.

19. The apparatus of claim 15, wherein the indication of the LBT success rate, the LBT failure rate, the SINR, the CQI, the RSRQ, the RSRP, the CBR, the CR, the RSSI, or the number of consecutive LBT failures associated with the LBT procedure is transmitted without other data.

20. A method of wireless communication performed by a user equipment (UE), comprising:
obtaining a first indication, based at least in part on a first threshold, that a hybrid automatic repeat request (HARQ) discontinuous transmission (DTX) is caused by a listen-before-talk (LBT) failure;
obtaining a second indication, based at least in part on a second threshold, that the HARQ DTX caused by the LBT failure is a type of HARQ DTX that is to be counted for identifying a sidelink radio link failure (RLF); and
identifying the sidelink RLF based at least in part on detecting a number of consecutive occurrences of the type of HARQ DTX occurrences.

21. The method of claim 20, further comprising:
receiving a sidelink medium access control message that indicates an LBT success rate,
wherein obtaining the first indication, based at least in part on the first threshold, that the HARQ DTX is caused by the LBT failure comprises determining that the LBT success rate is less than a first LBT success rate threshold.

22. The method of claim 20, further comprising:
receiving a sidelink medium access control message that indicates an LBT failure rate,
wherein obtaining the first indication, based at least in part on the first threshold, that the HARQ DTX is caused by the LBT failure comprises determining that the LBT failure rate is greater than a first LBT failure rate threshold.

23. The method of claim 20, further comprising:
receiving a sidelink medium access control message that indicates a signal-to-interference-plus-noise ratio (SINR), a channel quality indicator (CQI), a reference signal received quality (RSRQ), a reference signal received power (RSRP), a channel busy ratio (CBR), a channel occupancy ratio (CR), or a received signal strength indicator (RSSI) associated with a sidelink connection,
wherein obtaining the first indication, based at least in part on the first threshold, that the HARQ DTX is caused by the LBT failure comprises determining that the SINR associated with the sidelink connection is greater than a first SINR threshold, a first CQI threshold, a first RSRQ threshold, a first RSRP threshold, a first CBR threshold, a first CR threshold, or a first RSSI threshold.

24. The method of claim 20, further comprising:
identifying an LBT success rate,
wherein obtaining the first indication, based at least in part on the first threshold, that the HARQ DTX is caused by the LBT failure comprises determining that the LBT success rate is less than a second LBT success rate threshold.

25. The method of claim 20, further comprising:
identifying an LBT failure rate,
wherein obtaining the first indication, based at least in part on the first threshold, that the HARQ DTX is caused by the LBT failure comprises determining that the LBT failure rate is greater than a second LBT failure rate threshold.

26. The method of claim 20, further comprising:
identifying a signal-to-interference-plus-noise ratio (SINR), a channel quality indicator (CQI), a reference signal received quality (RSRQ), a reference signal received power (RSRP), a channel busy ratio (CBR), a channel occupancy ratio (CR), or a received signal strength indicator (RSSI) associated with a sidelink connection,
wherein obtaining the first indication, based at least in part on the first threshold, that the HARQ DTX is caused by the LBT failure comprises determining that the SINR associated with the sidelink connection is greater than a second SINR threshold, a second CQI threshold, a second RSRQ threshold, a second RSRP threshold, a second CBR threshold, a second CR threshold, or a second RSSI threshold.

27. The method of claim 20, further comprising:
identifying a number of acknowledgement (ACK) or negative acknowledgement (NACK) messages associated with one or more HARQ feedback occasions of a plurality of HARQ feedback occasions,
wherein obtaining the first indication, based at least in part on the first threshold, that the HARQ DTX is caused by the LBT failure comprises determining that the number of ACK or NACK messages associated with the one or more HARQ feedback occasions is greater than a HARQ feedback occasion threshold.

28. The method of claim 20, further comprising:
receiving a sidelink medium access control message that indicates a number of consecutive LBT failures,
wherein obtaining the second indication, based at least in part on the second threshold, that the HARQ DTX caused by the LBT failure is the type of HARQ DTX that is to be counted for identifying the sidelink RLF comprises determining that the number of consecutive LBT failures is greater than a first consecutive LBT failure threshold.

29. The method of claim 20, further comprising:
identifying a number of consecutive LBT failures,
wherein obtaining the second indication, based at least in part on the second threshold, that the HARQ DTX caused by the LBT failure is the type of HARQ DTX that is to be counted for identifying the sidelink RLF comprises determining that the number of consecutive LBT failures is greater than a second consecutive LBT failure threshold.

30. A method of wireless communication performed by a user equipment (UE), comprising:

obtaining, for an other UE, an indication of a listen-before-talk (LBT) success rate, an LBT failure rate, a signal-to-interference-plus-noise ratio (SINR), a channel quality indicator (CQI), a reference signal received quality (RSRQ), a reference signal received power (RSRP), a channel busy ratio (CBR), a channel occupancy ratio (CR), a received signal strength indicator (RSSI), or a number of consecutive LBT failures associated with an LBT procedure; and transmitting, to the other UE and in a media access control (MAC) control element, the indication of the LBT success rate, the LBT failure rate, the SINR, the CQI, the RSRQ, the RSRP, the CBR, the CR, the RSSI, or the number of consecutive LBT failures associated with the LBT procedure.

* * * * *